(12) United States Patent
Tazoe et al.

(10) Patent No.: US 6,739,677 B2
(45) Date of Patent: May 25, 2004

(54) BRAKE CONTROL APPARATUS

(75) Inventors: Kazuhiko Tazoe, Fujisawa (JP); Hideo Nakamura, Yokohama (JP); Junji Tsutsumi, Fujisawa (JP); Hiroki Sasaki, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/364,362

(22) Filed: Feb. 12, 2003

(65) Prior Publication Data

US 2003/0173826 A1 Sep. 18, 2003

(30) Foreign Application Priority Data

Feb. 15, 2002 (JP) .......................... 2002-037591
Jul. 22, 2002 (JP) .......................... 2002-212899

(51) Int. Cl.[7] ............................... B60T 8/64
(52) U.S. Cl. ........................ 303/152; 188/156
(58) Field of Search ................ 303/152, 3; 188/156, 188/158; 180/65.1, 65.2, 65.3, 65.4, 165; 318/376; 701/22

(56) References Cited

U.S. PATENT DOCUMENTS

| | | | |
|---|---|---|---|
| 5,322,352 A | * 6/1994 | Ohno et al. ............... | 303/3 |
| 5,378,053 A | * 1/1995 | Patient et al. ............. | 303/3 |
| 5,632,534 A | * 5/1997 | Knechtges ................ | 303/152 |
| 5,839,800 A | * 11/1998 | Koga et al. ............... | 303/152 |
| 5,895,100 A | 4/1999 | Ito et al. | |
| 5,951,115 A | 9/1999 | Sakai et al. | |
| 5,967,621 A | * 10/1999 | Ito et al. ................... | 303/15 |
| 6,021,365 A | 2/2000 | Ishii et al. | |
| 6,126,251 A | 10/2000 | Yoshii et al. | |
| 6,132,015 A | 10/2000 | Aoyama | |
| 6,142,586 A | 11/2000 | Sakai | |
| 6,176,556 B1 | 1/2001 | Kizer | |
| 6,325,470 B1 | 12/2001 | Schneider | |
| 6,353,786 B1 | 3/2002 | Yamada et al. | |
| 6,359,349 B1 | 3/2002 | Sakamoto | |
| 6,457,784 B1 | 10/2002 | Bohm et al. | |
| 6,598,945 B2 | * 7/2003 | Shimada et al. ........... | 303/152 |
| 6,655,754 B2 | * 12/2003 | Crombez et al. .......... | 303/152 |
| 2001/0024062 A1 | 9/2001 | Yoshino | |
| 2001/0039230 A1 | 11/2001 | Severinsky et al. | |
| 2002/0007974 A1 | 1/2002 | Nagano et al. | |
| 2002/0020984 A1 | 2/2002 | Dunkley | |

FOREIGN PATENT DOCUMENTS

| | | |
|---|---|---|
| JP | 5-161209 A | 6/1993 |
| JP | 5-161212 A | 6/1993 |
| JP | 5-161213 A | 6/1993 |

(List continued on next page.)

*Primary Examiner*—Jack Lavinder
*Assistant Examiner*—Mariano Sy
(74) *Attorney, Agent, or Firm*—Shinjyu Global IP Counselors, LLP.

(57) ABSTRACT

A brake control apparatus is configured to suppress fluctuations in the deceleration when transferring from cooperative braking to regenerative braking or hydraulic braking. The brake control apparatus calculates a braking torque command value feed forward component for reaching a target deceleration corresponding to the master cylinder pressure according to an ideal reference model. The brake control apparatus also calculates the braking torque command value feedback component to find a base deceleration for feeding back the difference between the base deceleration and the vehicle deceleration. The brake control apparatus then calculates the braking torque command value by adding the components together. After apportioning the braking torque command value into hydraulic and regenerative braking torque command values, the brake control apparatus phase compensates the braking torque command values to match their braking response characteristic with a vehicle model having a slower response characteristic than the ideal reference model.

13 Claims, 17 Drawing Sheets

FOREIGN PATENT DOCUMENTS

| | | |
|---|---|---|
| JP | 7-223532 A | 8/1995 |
| JP | 7-336805 A | 12/1995 |
| JP | 9-215107 A | 8/1997 |
| JP | 10-044952 A | 2/1998 |
| JP | 10-044953 A | 2/1998 |
| JP | 10-217935 A | 8/1998 |
| JP | 10-243501 A | 9/1998 |
| JP | 10-264793 A | 10/1998 |
| JP | 11-027802 A | 1/1999 |
| JP | 11-048954 A | 2/1999 |
| JP | 11-115702 A | 4/1999 |
| JP | 11-115746 A | 4/1999 |
| JP | 11-301439 A | 11/1999 |
| JP | 2001-008306 A | 1/2001 |
| JP | 2001-063540 A | 3/2001 |
| JP | 2001-169406 A | 6/2001 |
| JP | 2002-506339 A | 2/2002 |

* cited by examiner

BRAKE CONTROL APPARATUS

BACKGROUND OF THE INVENTION

1. Field of the Invention

The present invention generally relates to a brake control apparatus that achieves a deceleration corresponding to the amount by which a driver operates the brake. More specifically, the present invention relates to a brake control apparatus in a vehicle equipped with a regenerative braking device (e.g., a motor generator) and a hydraulic braking device (e.g., wheel cylinders).

2. Background Information

Some hybrid vehicles and electric vehicles are equipped with a hydraulic braking system and a motor-generator that also functions as a regenerative braking system. The regenerative braking system uses the motor-generator as a generator when a driver releases his foot from an accelerator pedal or when a brake pedal is depressed, and to decelerate a vehicle by transforming kinetic energy into electrical energy (regenerative braking). The electrical power which is then generated is stored in a battery or capacitor. An example of a brake control apparatus for controlling vehicles equipped with a hydraulic braking system and a regenerative braking system is described in Japanese Laid-Open Patent Publication No. 7-223532. This brake control apparatus calculates a braking force command value based on the deceleration corresponding to the amount by which the driver operated the brake, apportions the result into a braking force command value for the regenerative braking system and a braking force command value for the hydraulic braking system. The brake control apparatus then controls the braking forces applied to the wheels based on these command values.

In view of the above, it will be apparent to those skilled in the art from this disclosure that there exists a need for an improved brake control apparatus that suppresses fluctuations in the deceleration when changing from cooperative braking to only regenerative braking or only hydraulic braking. This invention addresses this need in the art as well as other needs, which will become apparent to those skilled in the art from this disclosure.

SUMMARY OF THE INVENTION

It has been discovered that in the aforementioned brake control apparatus, the regenerative braking force varies depending upon the traveling speed of the vehicle, and it is necessary to change the braking force apportioned to the hydraulic braking system in response to the change in the regenerative braking force. It has also been discovered that regenerative braking systems have different control precision and response times in comparison to hydraulic braking systems. These differences between the two braking systems cause the deceleration experienced by the vehicle or the wheels to fluctuate.

The present invention was developed in order to solve these problems. One object of the present invention is to provide a brake control apparatus that can stabilize the deceleration experienced by the wheels.

In order to achieve the aforementioned object, a brake control apparatus is provided that basically comprises a hydraulic braking system, a regenerative braking system, a target deceleration setting device, a deceleration detecting device, a braking force command value calculating device, a braking force apportioning device, a phase compensating device, a hydraulic braking control device and a regenerative braking control device. The hydraulic braking system is configured to impart a hydraulic braking force to a wheel using brake fluid pressure with a hydraulic braking response characteristic. The regenerative braking system is configured to impart a regenerative braking force to the wheel using regenerative braking with a regenerative braking response characteristic. The target deceleration setting device is configured to set a target deceleration based on a signal indicative of a braking operation amount. The deceleration detecting device is configured to detect a deceleration experienced by the wheel. The braking force command value calculating device is configured to calculate a braking force command value that is needed to cause the deceleration detected by the deceleration detecting device to substantially match the target deceleration set by the target deceleration setting device based on an ideal reference model response characteristic. The braking force apportioning device is configured to apportion the braking force command value calculated by the braking force command value calculating device into a hydraulic braking force command value to be applied by the hydraulic braking system and a regenerative braking force command value to be applied by the regenerative braking system. The phase compensating device is configured to apply a phase compensation to at least one of the hydraulic braking force command value and the regenerative braking force command value obtained by the braking force apportioning device such that the hydraulic braking response characteristic of the hydraulic braking force command value and the regenerative braking response characteristic of the regenerative braking force command value substantially match a vehicle model response characteristic. The hydraulic braking control device is configured to control the hydraulic braking force applied to the wheel by the hydraulic braking system based on the hydraulic braking force command value that has been phase compensated by the phase compensating device. The regenerative braking control device is configured to control the regenerative braking force applied to the wheel by the regenerative braking system based on a regenerative braking force command value that has been phase compensated by the phase compensating device.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
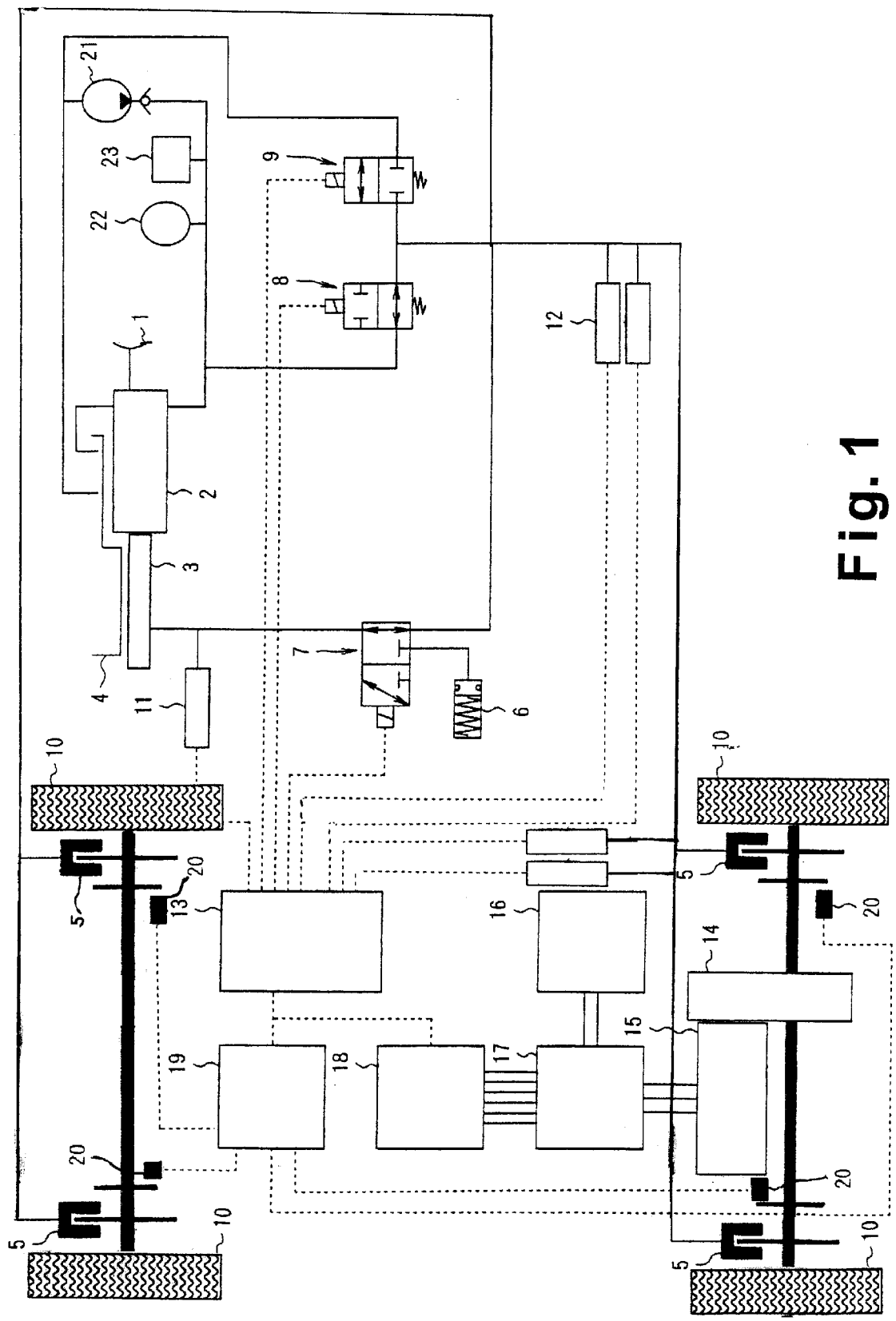
FIG. 1 is a schematic view of a cooperative braking system that exemplifies a regenerative cooperative braking control apparatus in accordance with one embodiment of the present invention.

Referring initially to FIG. 1, a vehicle braking system is schematically illustrated that utilizes a brake control apparatus in accordance with a first embodiment of the present invention. The vehicle braking system is a hydraulic-regenerative cooperative brake control system that efficiently recovers regenerative energy by executing control to reduce the brake fluid pressure when it is controlling the regenerative braking torque by way of an AC synchronous motor. In FIG. 1, the vehicle braking system basically includes a brake pedal 1, a booster 2, a master cylinder 3, a brake fluid reservoir 4, and a plurality of wheel cylinders 5. A brake fluid pressure circuit controls the brake fluid pressure at each of the wheel cylinders 5 individually. The brake fluid pressure circuit basically includes a stroke simulator 6, a stroke simulator selector valve 7, a pressure increasing valve 8 and a pressure reducing valve 9.

The brake pedal 1 that is operated by the driver is linked to the master cylinder 3 via the booster 2 in a conventional manner. The booster 2 utilizes the high-pressure brake fluid pressurized by a pump 21 and stored in an accumulator 22 to multiply the force with which the brake pedal 1 is depressed and deliver the multiplied force to the master cylinder 3. The pump 21 is preferably sequence-controlled by a pressure switch 23.

The master cylinder 3 is connected to the wheel cylinder 5 of each of the wheels 10. Along the brake fluid path therebetween is the stroke simulator selector valve 7 that serves to switch to the stroke simulator 6 provided with a fluid load equal to that of the wheel cylinders 5. In short, the master cylinder 3 is connected to the wheel cylinders 5 when the stroke simulator selector valve 7 is not energized, and the master cylinder 3 is connected to the stroke simulator 6 such that the wheel cylinders 5 are cut off from the brake fluid pressure of the master cylinder 3 when the stroke simulator selector valve 7 is energized.

Depending on the operation of the stroke simulator selector valve 7, the pressure increasing valve 8 serves to increase the pressure by supplying the output pressure of the pump 21 or the stored pressure of the accumulator 22 to the wheel cylinders 5. The pressure reducing valve 9, on the other hand, serves to reduce the pressure by returning the brake fluid pressure of the wheel cylinders 5 to the reservoir 4. In particular, the pressure increasing valve 8 interrupts the connection between the wheel cylinders 5 and either the pump 21 or the accumulator 22 when it is not energized and connects the wheel cylinders 5 to either the pump 21 or the accumulator 22 when it is energized. Meanwhile, the pressure reducing valve 9 interrupts the connection between the wheel cylinders 5 and the reservoir 4 when it is not energized and connects the wheel cylinders 5 to the reservoir 4 when it is energized. Therefore, in a state where the wheel cylinders 5 are disconnected from the master cylinder 3 by the stroke simulator selector valve 7, the brake fluid pressure in the wheel cylinders 5 can be increased independently from the output pressure of the master cylinder 3 by energizing the pressure increasing valve 8. Also, in a state where the wheel cylinders 5 are disconnected from the master cylinder 3 by the stroke simulator selector valve 7, the brake fluid pressure in the wheel cylinders 5 can be reduced independently from the output pressure by energizing the pressure reducing valve 9.

This brake fluid hydraulic circuit is provided with a master cylinder pressure sensor 11 that detects the output pressure of the master cylinder 3 and a plurality of wheel cylinder pressure sensors 12 that detects the brake fluid pressure in the wheel cylinders 5 when the wheel cylinders 5 are disconnected from the master cylinder 3 by the stroke simulator selector valve 7. The stroke simulator selector valve 7, the pressure increasing valve 8, and the pressure reducing valve 9 are controlled by commands issued from a brake fluid pressure control unit 13 based on the brake fluid pressures detected by the pressure sensors 11 and 12.

Among the wheels 10, the front wheels are the drive wheels. An AC synchronous motor, i.e., a motor generator 15, is connected to the front wheels 10 via a gear box 14. The motor generator 15 can drive the wheels 10 by functioning as a motor running off electric power from the battery 16 or it can store electricity in the battery 16 by functioning as a generator running off road-surface drive torque from the wheels 10. An alternating current control circuit, i.e., an inverter 17, is disposed between the battery 16 and the motor generator 15, and serves to convert between alternating current and direct current in response to a command (three-phase PWM signal) from the motor control unit 18. This allows the drive torque of the motor generator 15 to be controlled and the vehicle kinetic energy resulting from regenerative brake control to be recovered and stored in the battery 16.

The brake fluid pressure control unit 13 and the motor control unit 18 are connected to the regenerative cooperative braking control unit 19 through a communication circuit.

Although the brake fluid pressure control unit 13 and the motor control unit 18 can control the brake fluid pressure of the wheel cylinders 5 and the rotational state of the motor generator 15, respectively, in a stand-alone manner, they can recover the kinetic energy of the vehicle and improve the fuel consumption in an efficient manner by executing their control operations in response to commands issued from the regenerative cooperative braking control unit 19.

More specifically, the motor control unit 18 controls the regenerative braking torque based on a regenerative braking torque command value, or a regenerative braking force command value, received from the regenerative cooperative braking control unit 19. As discussed below in more detail, the control unit 18 also calculates the maximum available regenerative torque value $T_{mmax}$ based on the charged state, temperature, etc., of the battery 16 and sends the result to the regenerative cooperative braking control unit 19. Meanwhile, the brake fluid pressure control unit 13 controls the brake fluid pressure of the wheel cylinders 5 in response to a brake fluid pressure command value received from the regenerative cooperative braking control unit 19. It also sends the master cylinder pressure and wheel cylinder pressure detected by the master cylinder pressure sensor 11 and the wheel cylinder pressure sensors 12 to the regenerative cooperative braking control unit 19. In order for the regenerative cooperative braking control unit 19 to be able to calculate the regenerative braking torque and brake fluid pressure command value, the vehicle is provided with a drive wheel speed sensor 20 that detects the rotational speed of drive wheels 10 (e.g., the front wheels).

Figure 3:
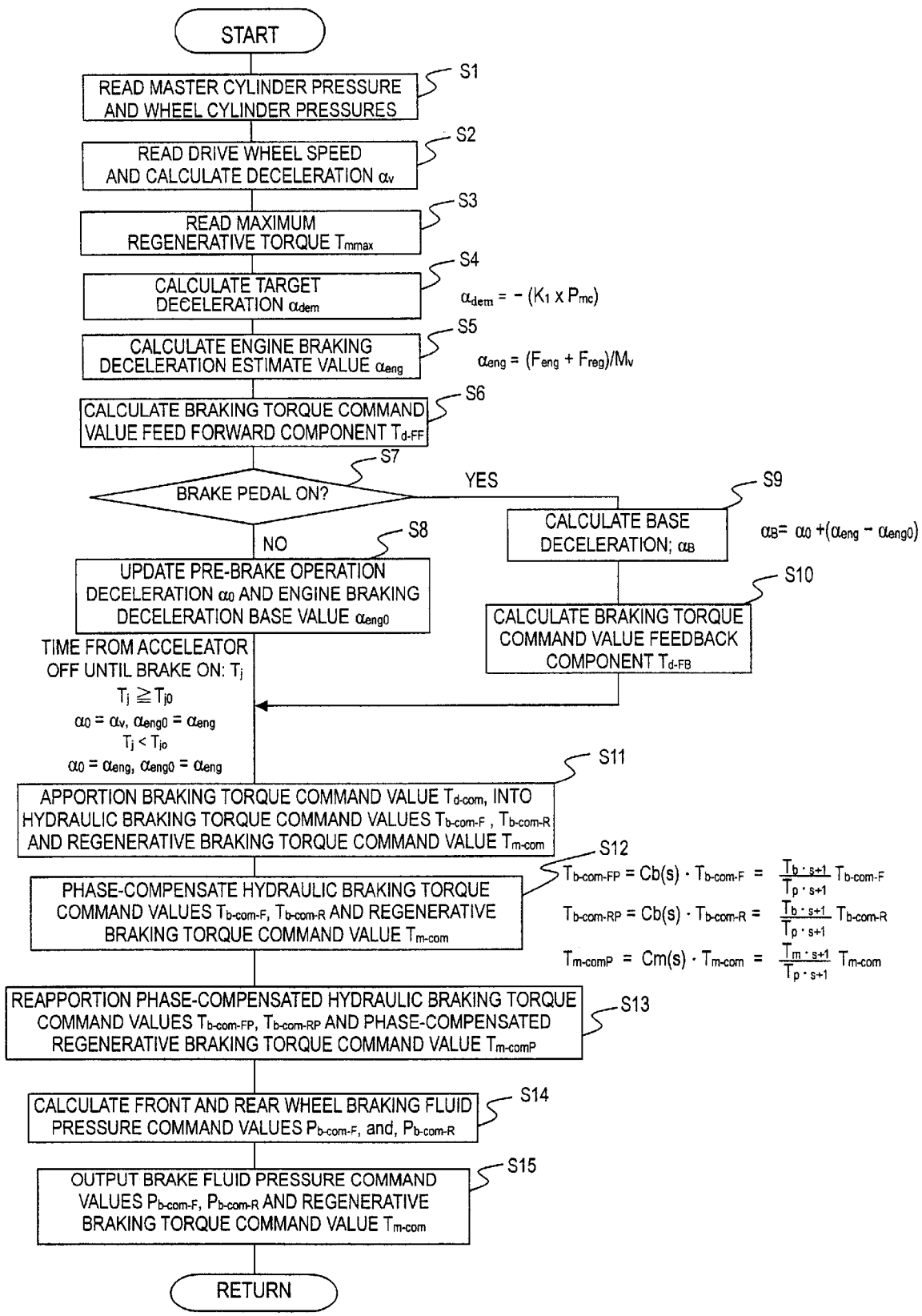
FIG. 3 is a flowchart showing the processing used for calculating the brake fluid pressure command value and the regenerative torque command value based on the braking torque command value calculation shown in FIG. 2.
Figure 6:
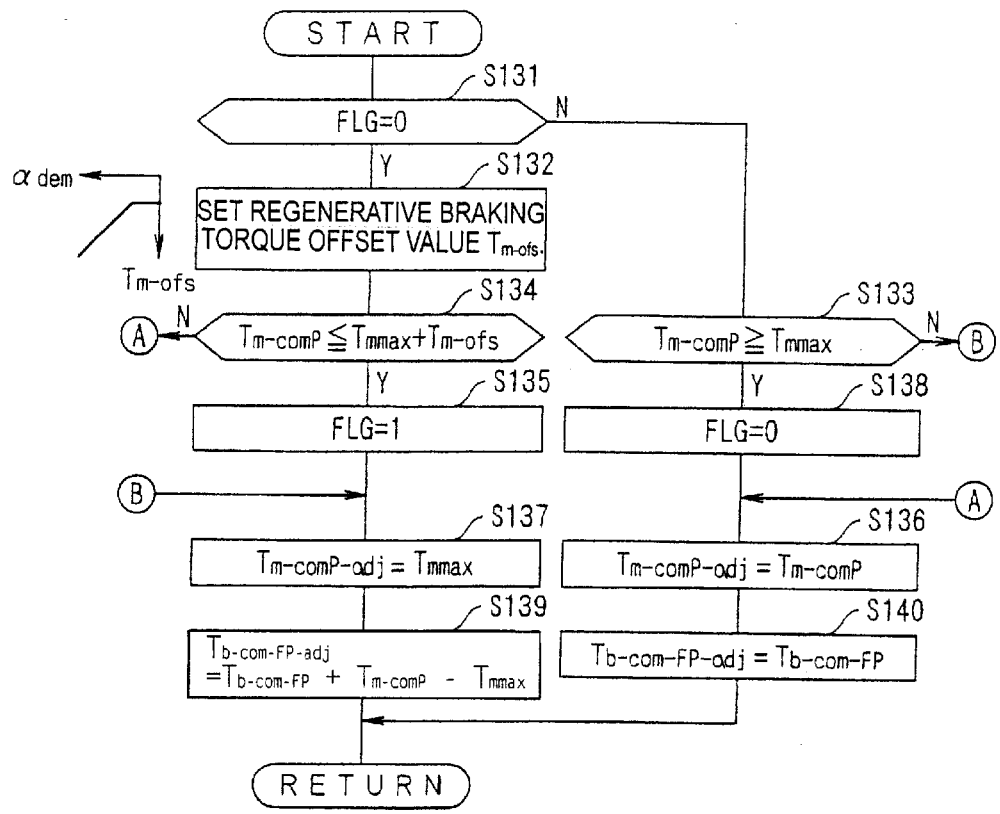
FIG. 6 is a flowchart of a sub-program for the braking force reapportionment executed during the processing shown in FIG. 3.

Each of the control units (i.e., the brake fluid pressure control unit 13, the motor control unit 18, and the regenerative cooperative braking control unit 19, etc.) is provided with a microcomputer or other processing device that executes the processes of FIGS. 3 and 6.

It will be apparent to those skilled in the art from this disclosure that the precise structure and algorithms for the control units 13, 18 and 19 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The control units 13, 18 and 19 can also include other conventional components such as an input interface circuit, an output interface circuit, and storage devices such as a ROM (Read Only Memory) device and a RAM (Random Access Memory) device. The brake fluid pressure control unit 13 and the motor control unit 18 create drive signals and control signals based on the command values and feed the signals to the aforementioned actuators. Meanwhile, the regenerative cooperative braking control unit 19 calculates the brake fluid pressure command value and regenerative torque command value that enable a degree of deceleration that matches the intention of the driver to be obtained and the vehicle kinetic energy to be recovered efficiently and sends these command values to the brake fluid pressure control unit 13 and the motor control unit 18, respectively.

Generally, as explained below in greater detail, the brake control apparatus of the present invention sets a target deceleration $\alpha_{dem}$ based on the amount by which the driver operates the brake pedal 1 and calculates the braking torque command value $T_{d-com}$ required to make the actual vehicle deceleration $\alpha_V$ of the vehicle match the target deceleration $\alpha_{dem}$ according to a prescribed ideal reference model response characteristic. The brake control apparatus then apportions the calculated braking torque command value $T_{d-com}$ into hydraulic braking torque command value $T_{b-com}$ for the hydraulic braking system and a regenerative braking torque command value $T_{m-com}$ for the regenerative braking system. Next, the brake control apparatus applies a phase compensation to both the hydraulic braking torque command value $T_{b-com}$ and the regenerative braking torque command value $T_{m-com}$ such that the braking torques of the hydraulic braking system and the regenerative braking system match the braking torque command values, respectively, according to a prescribed vehicle model response characteristic. Finally, the brake control apparatus controls the braking torque applied to the front and rear wheels 10 by the hydraulic braking system based on the phase compensated hydraulic braking torque command value. Likewise, the brake control apparatus controls the braking torque applied to the front wheels 10 by the regenerative braking system based on the phase compensated regenerative braking torque command value. Thus, this brake control apparatus can make the response characteristic of each braking system match the vehicle model response characteristic to stabilize the deceleration of the wheels 10.

More preferably, the brake control apparatus of the present invention sets the vehicle model response characteristic of the phase compensating device such that it is slower than the ideal reference model response characteristic of the braking torque command value calculating device. Consequently, fluctuations in deceleration are suppressed and the deceleration of the vehicle or wheels is stabilized further as explained below. While the description of present invention uses braking torque to describe a preferred embodiment, it will be apparent to those skilled in the art from this disclosure that the present invention can also be expressed in terms of braking force.

Next, one preferred method of calculating the braking torque command value $T_{d-com}$, which is necessary for the regenerative cooperative brake unit 19 to calculate a hydraulic braking torque command value $T_{b-com}$ and a regenerative braking torque command value $T_{m-com}$, will be explained based on the block diagram shown in FIG. 2. A target deceleration $\alpha_{dem}$ is first obtained to calculate the braking torque command value $T_{d-com}$. For example, assume the target deceleration $\alpha_{dem}$ is a value proportional to the amount by which the brake pedal 1 is depressed (i.e., the braking operation amount which is the amount by which the brake is operated) by the driver, i.e., proportional to the master cylinder pressure $P_{mc}$. A feed forward component $T_{d-FF}$ of the braking torque command value $T_{d-com}$ is obtained based on the target deceleration $\alpha_{dem}$ alone, while a feedback component $T_{d-FB}$ of the braking torque command value $T_{d-com}$ is obtained by feeding back an actual vehicle deceleration $\alpha_V$ that is being experienced by the vehicle. The feed forward component $T_{d-FF}$ and the feedback component $T_{d-FB}$ are added together to obtain the braking torque command value $T_{d-com}$.

Preferably, the hydraulic braking torque command value $T_{b-com}$ and the regenerative braking torque command value $T_{m-com}$ are both phase compensated. Alternatively, at least one of the hydraulic braking torque command value $T_{b-com}$ and the regenerative braking torque command value $T_{m-com}$ are phase compensated as explained below. By having phase compensator for both of the hydraulic braking torque command value $T_{b-com}$ and the regenerative braking torque command value $T_{m-com}$ as opposed to have applying a single phase compensator to only one of them, the response characteristics of both braking systems can be coordinated and integrated to a single response characteristic. Then, target deceleration $\alpha_{dem}$, which will be feed forward compensated, is preferably based on the prescribed ideal reference model response characteristic and the prescribed vehicle model response characteristic. Accordingly, the deceleration detected by the deceleration detecting section or device (Step S2 of the processing described in FIG. 3) matches with the ideal reference model response characteristic, to the target deceleration $\alpha_{dem}$, and therefore, the deceleration of the vehicle or the wheels 10 can be stabilized.

By using a phase compensator, the response characteristic of the subsequent braking system can be slower and/or faster. However, the braking system that operates faster will be suppressed because of the limitation of the actuator operation, etc. Generally, the control precision (such as response characteristics, control errors) of the regenerative brake torque servo system is better than that of the hydraulic brake torque servo system. Thus, when only one of the hydraulic braking torque command value $T_{b\text{-}com}$ and the regenerative braking torque command value $T_{m\text{-}com}$ is phase compensated, it is more preferably to use a phase compensator with the regenerative braking system and coordinate the response characteristics of the regenerative brake with the response characteristic of the hydraulic brake. However, if the control precision of the hydraulic brake torque servo system is better than that of the regenerative for any reason (such as the cost), it is possible to use a phase compensator with the hydraulic braking system. The effect obtained here is to coordinate the response characteristic of one of the braking system with the response characteristic of the other. Accordingly, the regenerative braking system and hydraulic braking system can be considered as one braking control system with a single response characteristic. Therefore, the fluctuations in the deceleration caused by having different response characteristics for different braking system can be prevented.

As discussed above, when only one phase compensator is used, the response characteristic is set to either one of the response characteristics of hydraulic or regenerative. For example, if the phase compensator is used for the regenerative braking system, the response characteristic has to be set to the response characteristic of the hydraulic braking system. However, if two phase compensators are used for both regenerative and hydraulic braking systems, it is possible to set a model response characteristic to a third response characteristic that are different from the response characteristics of either the regenerative braking system or the hydraulic braking system. Of course, it is also possible to set the response characteristic to either one of the response characteristics of the braking system regenerative or the hydraulic braking system. Thus, although the brake operated faster is suppressed by the limitation of the operation of the actuator, etc., it is possible to set the response characteristic to an arbitrary value in a certain range.

The response characteristic that is coordinated by the phase compensator is a representative response characteristic. Therefore, if the response characteristic of the brake is varied for any reason (degradation of the actuator, etc.) when the command value greatly fluctuates, the braking torque is also changed along with the fluctuation of the response characteristic. However, if the response characteristics of both regenerative and hydraulic braking systems are set slower, the fluctuation of the braking torque in case the actual response characteristic is changed can be suppressed (See, FIGS. 14 and 15 discussed below).

Accordingly, it is possible to have a response characteristic (single response characteristic) by having only one phase compensator applied to either the hydraulic braking torque command value $T_{b\text{-}com}$ or the regenerative braking torque command value $T_{m\text{-}com}$. However, if we use two phase compensators to phase compensate both the hydraulic braking torque command value $T_{b\text{-}com}$ and the regenerative braking torque command value $T_{m\text{-}com}$, it is possible to make a third response characteristic. For example, suppose the time constant of the hydraulic braking system is 100 ms and the time constant of the regenerative braking system is 10 ms. If only one phase compensator were used, then the response characteristic can be adjusted to either 100 ms or 10 ms. However, if two phase compensators are used, then the response characteristic can be adjusted to either 200 ms or 80 ms (a third response characteristic).

Figure 2:
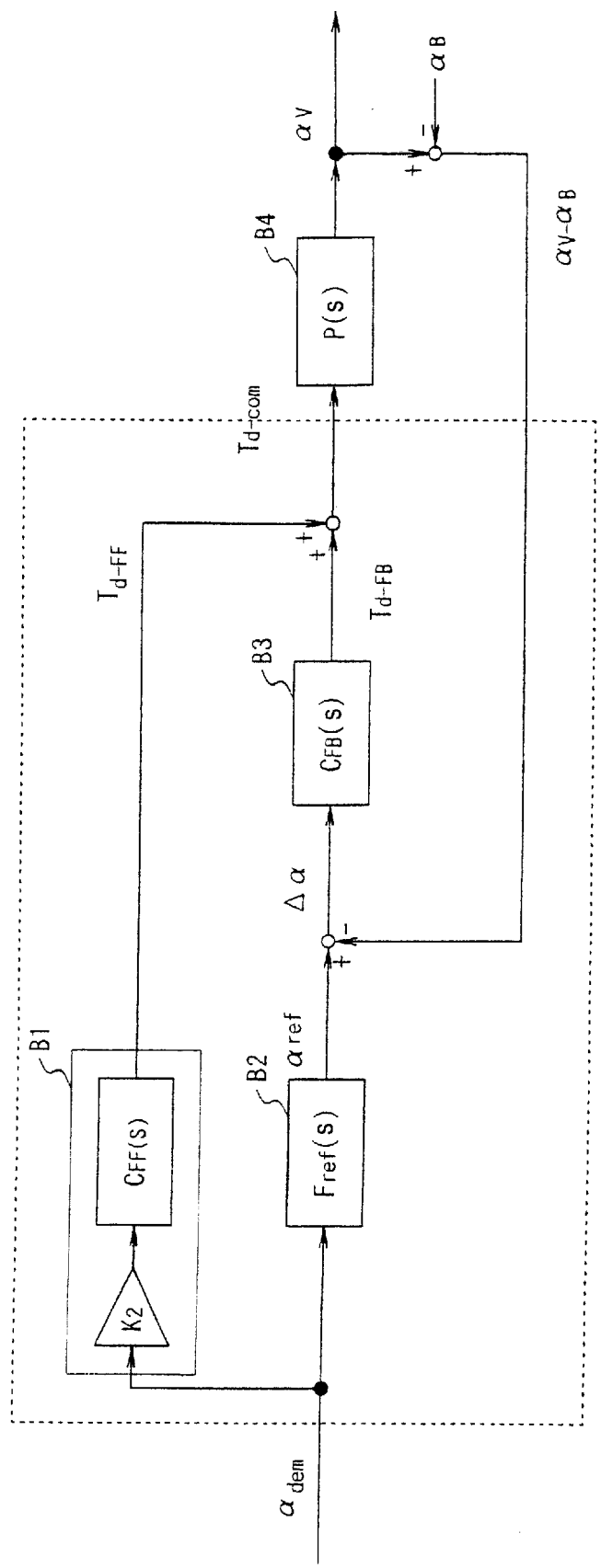
FIG. 2 is a block diagram of the braking torque command value calculation executed by the regenerative cooperative braking control unit.

Referring to FIG. 2, a response characteristic P(s) in block B4 corresponds to the vehicle, which the vehicle deceleration $\alpha_V$ is the deceleration achieved or actually experienced by the vehicle. Defining a base deceleration $\alpha_B$ as the deceleration immediately before application of the brake begins, e.g., deceleration resulting from engine braking or an upward slope or acceleration resulting from a downward slope, the deceleration to be achieved by the brake control system is the value obtained when the base deceleration $\alpha_B$ is subtracted from the vehicle deceleration $\alpha_V$ (i.e., $\alpha_V\text{-}\alpha_B$).

First, at block B1 of FIG. 2, the feed forward component $T_{d\text{-}FF}$ of the braking torque command value $T_{d\text{-}com}$ is calculated using Equation 1 as shown below. The feed forward component $T_{d\text{-}FF}$ is used to make the vehicle model response characteristic $P_m(s)$ (first order time delay characteristic having time constant $T_p$) match the ideal reference model response characteristic $F_{ref}(s)$ of the vehicle (first order time delay characteristic having time constant $T_r$). The feed forward component $T_{d\text{-}FF}$ of the braking torque command value $T_{d\text{-}com}$, is calculated by applying a feed-forward phase compensator $C_{FF}(s)$ processing to the target deceleration $\alpha_{dem}$. In Equation 1 below, a constant $K_2$ is associated with various vehicle factors. Thus, the constant $K_2$ is used for converting the target deceleration $\alpha_{dem}$ into braking torque.

Equation 1:

$$T_{d\text{-}FF} = C_{FF}(s) K_2 \alpha_{dem},$$

where $$C_{FF}(s) = F_{ref}(s)/P_m(s) = (T_p \cdot s + 1)/(T_r \cdot s + 1) \qquad (1)$$

Meanwhile, a reference deceleration $\alpha_{ref}$ is calculated, which is used to calculate the feedback component $T_{d\text{-}FB}$ of the braking torque command value $T_{d\text{-}com}$, the reference deceleration $\alpha_{ref}$ is calculated by applying the reference model response characteristic $F_{ref}(s)$ processing shown in Equation 2 below to the target acceleration $\alpha_{dem}$ in block B2.

Equation 2:

$$F_{ref}(s) = 1/(T_r \cdot s + 1) \qquad (2)$$

The feedback difference value $\Delta\alpha$ is then calculated by subtracting the difference between the vehicle deceleration $\alpha_V$ and the base deceleration $\alpha_B$, i.e., $(\alpha_V\text{-}\alpha_B)$, from the calculated reference deceleration value $\alpha_{ref}$ using an adder-subtracter. Then, in block B3, the feedback compensator $C_{FB}(s)$ processing shown in Equation 3 below is applied to the feedback difference value $\Delta\alpha$ to calculate the feedback component $T_{d\text{-}FB}$ of the braking torque command value $T_{d\text{-}com}$. The feedback compensator $C_{FB}(s)$ is preferably a basic proportional integral (PI) controller. Control constants $K_P$ and $K_I$ in the Equation 3 are established in view of a gain margin and a phase margin.

Equation 3:

$$C_{FB}(s)=(K_p \cdot s+K_I)/s \quad (3)$$

Thus, the braking torque command value $T_{d\text{-}com}$ can be calculated by adding the feed forward component $T_{d\text{-}FF}$ of the braking torque command value to the feedback component $T_{d\text{-}FB}$ of the braking torque command value using an adder.

Now, the flowchart shown in FIG. 3 will be used to explain the processing that the regenerative cooperative braking control unit 19 executes in order to calculate the brake fluid pressure command value and the regenerative torque command value.

This processing is executed by timer interruption every time a prescribed time period $\Delta T$ (e.g., 10 milliseconds) elapses. Although the flowchart does not include steps specifically for communications, information obtained by way of the computations is stored as necessary and stored information is retrieved as necessary.

In step S1, the regenerative cooperative braking control unit 19 receives the master cylinder pressure $P_{mc}$ detected by the master cylinder pressure sensor 11 and the wheel cylinder pressure $P_{wc}$ detected by the wheel cylinder pressure sensors 12 from the brake fluid pressure control unit 13.

In step S2, the regenerative cooperative braking control unit 19 reads the drive wheel speed detected by the drive wheel speed sensor 20 as the traveling speed of the vehicle and uses the transfer function $F_{bpf}(s)$ shown in Equation 4 to apply a band pass filter processing to the drive wheel speed, and thereby, determine the drive wheel deceleration. The regenerative cooperative braking control unit 19 then designates the result as the vehicle deceleration $\alpha_V$ actually experienced by the vehicle. In the equation, $\overline{\omega}$ is a natural angular frequency and $\zeta$ is a dampening constant.

Equation 4:

$$F_{bpf}(s)=S/(s^2/\overline{\omega}^2+2\zeta s/\overline{\omega}+1) \quad (4)$$

In step S3, the regenerative cooperative braking control unit 19 receives the maximum available regenerative torque $T_{mmax}$ from the motor control unit 18.

In step S4, the regenerative cooperative braking control unit 19 multiplies the master cylinder pressure $P_{mc}$ received in step S1 by a constant $K_1$ and calculates the negative value thereof as the target deceleration $\alpha_{dem}$.

Figure 4:
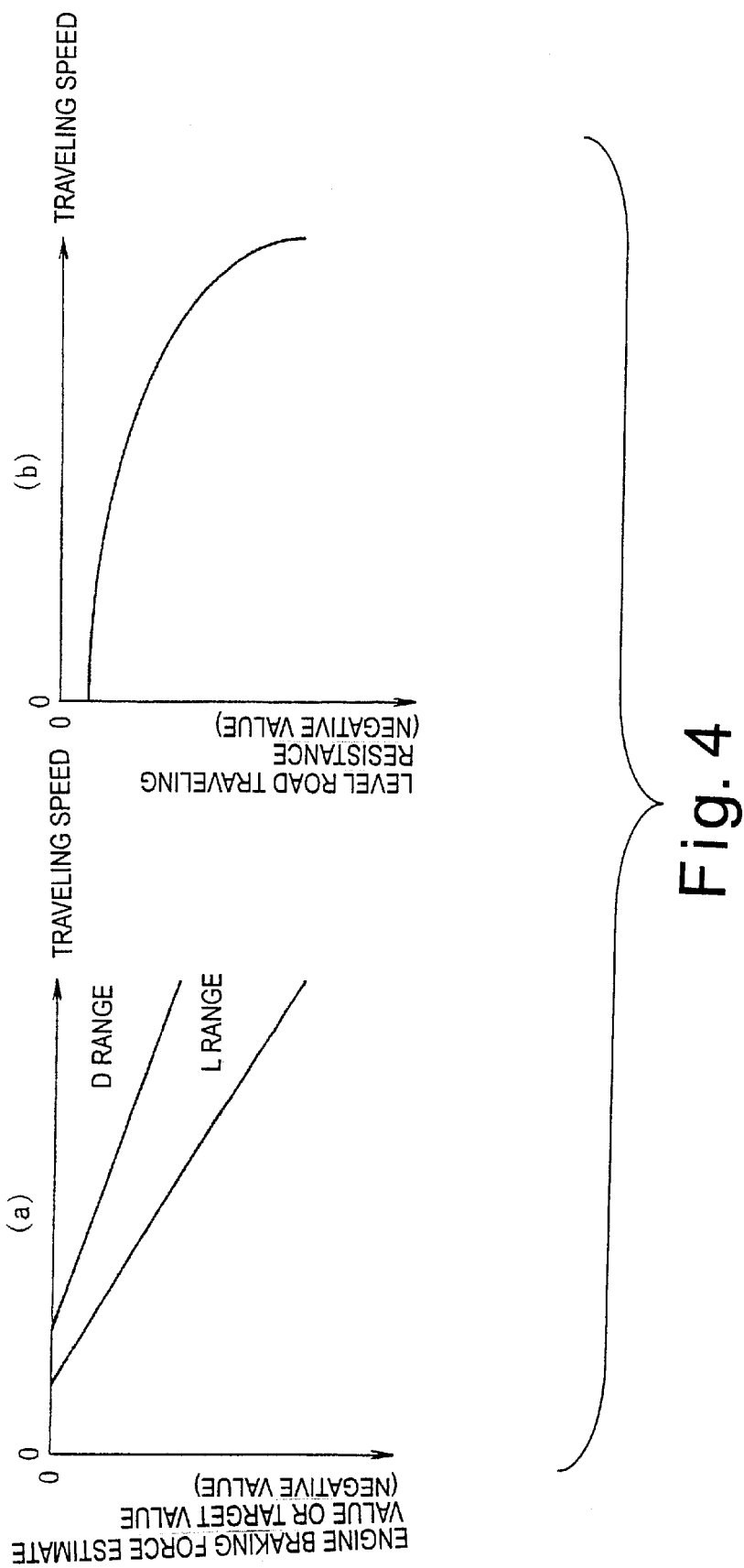
FIG. 4 shows a pair of control maps used during the processing shown in FIG. 3.

In step S5, the regenerative cooperative braking control unit 19 then calculates an estimate of the deceleration resulting from the engine braking force, i.e., an engine braking deceleration estimated value $\alpha_{eng}$. More specifically, the drive wheel speed received in step S2 is designated as the traveling speed of the vehicle and the engine braking estimate value or target value $F_{eng}$ is found based on the traveling speed and shift position using the control map (a) of FIG. 4. Simultaneously, the traveling resistance $F_{reg}$ for a level road is found based on the vehicle traveling speed using the control map (b) of FIG. 4. Then, the sum of the two forces is divided by an averaged vehicle weight $M_v$ to calculate the engine braking deceleration estimated value $\alpha_{eng}$.

In step S6, the regenerative cooperative braking control unit 19 calculates the feed forward component $T_{d\text{-}FF}$ of the braking torque command value $T_{d\text{-}com}$ by applying the feed forward phase compensator $C_{FF}(s)$ that processes Equation 1 to the target deceleration $\alpha_{dem}$ calculated in step S4.

In step S7, the regenerative cooperative braking control unit 19 determines if the vehicle is in the brake pedal ON (brake operation) state, i.e., if the brake pedal is being depressed, by using such factors as whether or not the master cylinder pressure $P_{mc}$ received in step S1 is greater than or equal to a relatively small prescribed value. If the brake pedal is in the ON state, the control unit 19 proceeds to step S9. If not, the control unit 19 proceeds to step S8.

In step S8, the regenerative cooperative braking control unit 19 updates the pre-brake operation deceleration $\alpha_0$ and the engine braking deceleration base value $\alpha_{eng0}$ and proceeds to step S11. More specifically, the brake start time $T_j$, which is the time from release of the accelerator pedal (accelerator OFF) until operation of the brake (brake ON), is found. If the brake start time $T_j$ is greater than or equal to a prescribed value $T_{j0}$ corresponding to, for example, the time required for the engine braking force to converge, then the vehicle deceleration $\alpha_V$ calculated in step S2 is assigned as the pre-brake operation deceleration $\alpha_0$ and the engine braking deceleration estimated value $\alpha_{eng}$ calculated in step S5 is assigned as the engine braking deceleration base value $\alpha_{eng0}$. Meanwhile, if the brake start time $T_j$ is less than the prescribed value $T_{j0}$, the engine braking deceleration estimated value $\alpha_{eng}$ calculated in step S5 is assigned as the pre-brake operation deceleration $\alpha_0$ and the same engine braking deceleration estimated value $\alpha_{eng}$ is assigned as the engine braking deceleration base value $\alpha_{eng0}$. In short, the actual vehicle deceleration $\alpha_V$ is used as the pre-brake operation deceleration $\alpha_0$ when the brake start time $T_j$ is greater than or equal to prescribed value $T_{j0}$ (which corresponds to the time required for engine braking to converge) and the engine braking deceleration estimated value $\alpha_{eng}$ that is expected to occur is used as the pre-brake operation deceleration $\alpha_0$ when the brake start time is below the prescribed value $T_{j0}$.

Meanwhile, in step S9, the regenerative cooperative braking control unit 19 calculates the base deceleration $\alpha_B$ by adding the value obtained by subtracting the engine braking deceleration base value $\alpha_{eng0}$ from the engine braking deceleration estimated value $\alpha_{eng}$ calculated in step S5 to the pre-brake operation deceleration $\alpha_0$. Control then proceeds to step S10.

In step S10, the regenerative cooperative braking control unit 19 calculates the reference deceleration $\alpha_{ref}$ by applying the reference model response characteristic $F_{ref}(s)$ that processes Equation 2 to the target deceleration $\alpha_{dem}$. The regenerative cooperative braking control unit 19 then uses the base deceleration $\alpha_B$ calculated in step S9 to calculate the deceleration feedback difference value $\Delta\alpha$ by subtracting the difference between the vehicle deceleration $\alpha_V$ and the base deceleration $\alpha_B$ (i.e., $\alpha_V$-$\alpha_B$) from the reference deceleration $\alpha_{ref}$, and then calculates the feedback component $T_{d\text{-}FB}$ of the braking torque command value by applying the feedback compensator $C_{FB}(s)$ that processes Equation 3 to the deceleration feedback difference value $\Delta\alpha$. The control unit 19 then proceeds to step S11.

In step S11, the regenerative cooperative braking control unit 19 then calculates the braking torque command value $T_{d\text{-}com}$ by adding together the feed forward component $T_{d\text{-}FF}$ of the braking torque command value $T_{d\text{-}com}$ calculated in step S6 and the feedback component $T_{d\text{-}FB}$ of the braking torque command value $T_{d\text{-}com}$ calculated in step S10. The regenerative cooperative braking control unit 19 then apportions the braking torque command value $T_{d\text{-}com}$ into the hydraulic braking torque command value $T_{b\text{-}com}$ and the regenerative braking torque command value $T_{m\text{-}com}$. In order to improve the fuel economy as much as possible, the braking torque command value $T_{d\text{-}com}$ is apportioned such that as much of the maximum regenerative torque $T_{mmax}$ received in step S3 is used as possible.

Figure 5:
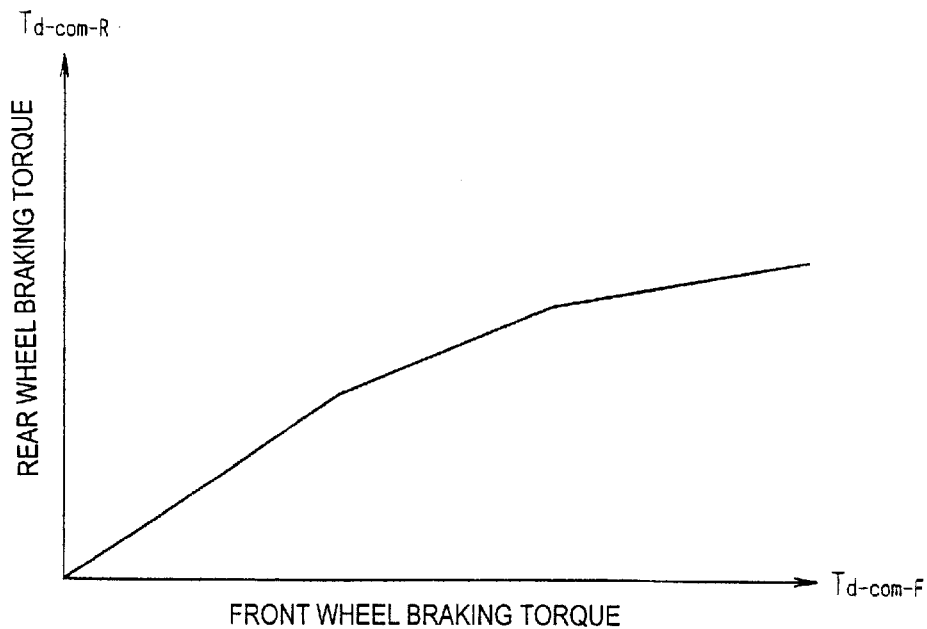
FIG. 5 shows a control map used during the processing shown in FIG. 3.

In this embodiment, the motor generator 15 only drives the front wheels 10 and executes regenerative braking using road-surface drive torque from the front wheels 10. Therefore, the apportionment is handled differently depending on the situation. First, the braking torque command value $T_{d-com}$ is apportioned into a front wheel braking torque command value $T_{d-com-F}$ and a rear wheel braking torque command value $T_{d-com-R}$ according to the front-rear wheel braking torque distribution control map (e.g., an ideal braking torque distribution map) shown in FIG. 5. Then, the apportionment is executed in accordance with the following Formula 30 with terms expressed in absolute values.

Formula 30:

$T_{mmax} > T_{d-com-F} + T_{d-com-R}$, then $T_{m-com} = T_{d-com-F} + T_{d-com-R} = T_{d-com}$ $T_{b-com-F} = 0$ $T_{b-com-R} = 0$      (1)

$T_{d-com-F} + T_{d-com-R} \geq T_{mmax} > T_{d-com-F}$, then $T_{m-com} = T_{mmax}$ $T_{b-com-F} = 0$ $T_{b-com-R} = T_{d-com-F} + T_{d-com-R} - T_{mmax}$      (2)

$T_{d-com-F} \geq T_{mmax} \geq$ Prescribed Value≈0, then $T_{m-com} = T_{mmax}$ $T_{b-com-F} = T_{d-com-F} - T_{mmax}$ $T_{b-com-R} = T_{d-com-R}$      (3)

Situations other than the above (1)–(3)

($T_{mmax} <$ Prescribed Value≈0), then $T_{m-com} = 0$ $T_{b-com-F} = T_{d-com-F}$ $T_{b-com-R} = T_{d-com-R}$      (4)

As seen in (1) of the Formula 30, when the sum of the absolute value of the front wheel braking torque command value $T_{d-com-F}$ and the absolute value of the rear wheel braking torque command value $T_{d-com-R}$, i.e., the absolute value of the braking torque command value $T_{d-com}$, is less than the absolute value of the maximum regenerative torque $T_{mmax}$, then the control unit 19 establishes regenerative braking only. This regenerative braking is accomplished by setting both the front wheel hydraulic braking torque command value $T_{b-com-F}$ and the rear wheel hydraulic braking torque command value $T_{b-com-R}$ to "0" and setting the regenerative braking torque command value $T_{m-com}$ to the braking torque command value $T_{d-com}$. As seen in (2) of the Formula 30, when the absolute value of the braking torque command value $T_{d-com}$ is greater than or equal to the absolute value of the maximum regenerative torque $T_{mmax}$ and the absolute value of the front wheel braking torque command value $T_{d-com-F}$ is less than the absolute value of the maximum regenerative torque $T_{mmax}$, the control unit 19 establishes front wheel regenerative braking and rear wheel hydraulic braking. The cooperative braking is accomplished by setting the front wheel hydraulic braking torque command value $T_{b-com-F}$ to "0," setting the rear wheel hydraulic braking torque command value $T_{b-com-R}$ to the value obtained by subtracting the maximum regenerative torque $T_{mmax}$ from the braking torque command value $T_{d-com}$, and setting the regenerative braking torque command value $T_{m-com}$ to the maximum regenerative torque $T_{mmax}$. As seen in (3) of the Formula 30, when the absolute value of the maximum regenerative torque $T_{mmax}$ is greater than or equal to a prescribed value that is close to "0" and the absolute value of the front wheel braking torque command value $T_{d-com-F}$ is greater than or equal to the absolute value of the maximum regenerative torque $T_{mmax}$, the control unit 19 establishes front wheel regenerative braking and front and rear wheel hydraulic braking. The cooperative braking is accomplished by setting the front wheel hydraulic braking torque command value $T_{b-com-F}$ to the value obtained by subtracting the maximum regenerative torque $T_{mmax}$ from the front wheel braking torque command value $T_{d-com-F}$, setting the rear wheel hydraulic braking torque command value $T_{b-com-R}$ to the rear wheel braking torque command value $T_{d-com-R}$, and setting the regenerative braking torque command value $T_{m-com}$ to the maximum regenerative torque $T_{mmax}$. As seen in (4) of the Formula 30, when the absolute value of the maximum regenerative torque $T_{mmax}$ is less than a prescribed value that is close to "0," the control unit 19 establishes hydraulic braking only by setting the front wheel hydraulic braking torque command value $T_{b-com-F}$ to the front wheel braking torque command value $T_{d-com-F}$, setting the rear wheel hydraulic braking torque command value $T_{b-com-R}$ to the rear wheel braking torque command value $T_{d-com-R}$, and setting the regenerative braking torque command value $T_{m-com}$ to "0."

In step S12, the regenerative cooperative braking control unit 19 applies a third phase compensation using Equation 5 to the regenerative braking torque command value $T_{m-com}$ and the front and rear wheel hydraulic braking torque command values $T_{b-com-F}$, $T_{b-com-R}$ calculated in step S11 in order to align the response characteristic of the hydraulic braking and the response characteristic of the regenerative braking with the aforementioned vehicle model response characteristic. In the equation, a response time constant $T_b$ for the hydraulic braking and a response time constant $T_m$ for the regenerative braking both are expressed as a first order time delay. Also, the time constant $T_p$ of the vehicle model response characteristic has been set such that it is larger than the time constant $T_r$ of the reference model.

Equation 5:

$T_{b-com-FP} = C_b(s)T_{b-com-F} = [(T_b \cdot s+1)/(T_p \cdot s+1)]T_{b-com-F}$ $T_{b-com-RP} = C_b(s)T_{b-com-R} = [(T_b \cdot s+1)/(T_p \cdot s+1)]T_{b-com-R}$ $T_{m-comP} = C_m(s)T_{m-com} = [(T_m \cdot s+1)/(T_p \cdot s+1)]T_{m-com}$      (5)

In step S13, the regenerative cooperative braking control unit 19 reapportions the regenerative braking torque command value $T_{m-comP}$ and the front and rear wheel hydraulic braking torque command values $T_{b-com-FP}$, $T_{b-com-RP}$, which were obtained by phase compensation in step S12, by executing the processing described in FIG. 6.

In step S14, the regenerative cooperative braking control unit 19 calculates the phase compensated brake fluid pressure command values $P_{b-com-F}$, $P_{b-com-R}$ for the front and rear wheels by multiplying the phase compensated front and rear wheel hydraulic braking torque command values $T_{b-com-FP}$, $T_{b-com-RP}$ obtained in step S12, i.e., more precisely, the reapportioned hydraulic braking torque command values $T_{b-com-FP-adj}$, $T_{b-com-RP-adj}$ obtained in step S13, by the prescribed vehicle factor constants $K_3$ and $K_4$, respectively.

In step S15, the regenerative cooperative braking control unit 19 sends the phase compensated regenerative braking torque command value $T_{m\text{-}comP}$ obtained in step S12, i.e., more precisely, the reapportioned regenerative braking torque command value $T_{m\text{-}comP\text{-}adj}$ obtained in step S13, to the motor control unit 18 and sends the front and rear wheel brake fluid pressure command values $P_{b\text{-}com\text{-}F}$, $P_{b\text{-}com\text{-}R}$ calculated in step S14 to the brake fluid pressure control unit 13. The regenerative cooperative braking control unit 19 then returns to the main program.

Now, the processing for reapportioning the braking torque executed in step S13 of FIG. 3 will be explained using FIG. 6. In step S131, the regenerative cooperative braking control unit 19 determines if the regenerative braking restriction flag FLG has been reset to "0." If the regenerative braking restriction flag FLG has been reset, the control unit 19 proceeds to step S132. If not, the control unit 19 proceeds to step S133.

Figure 7:
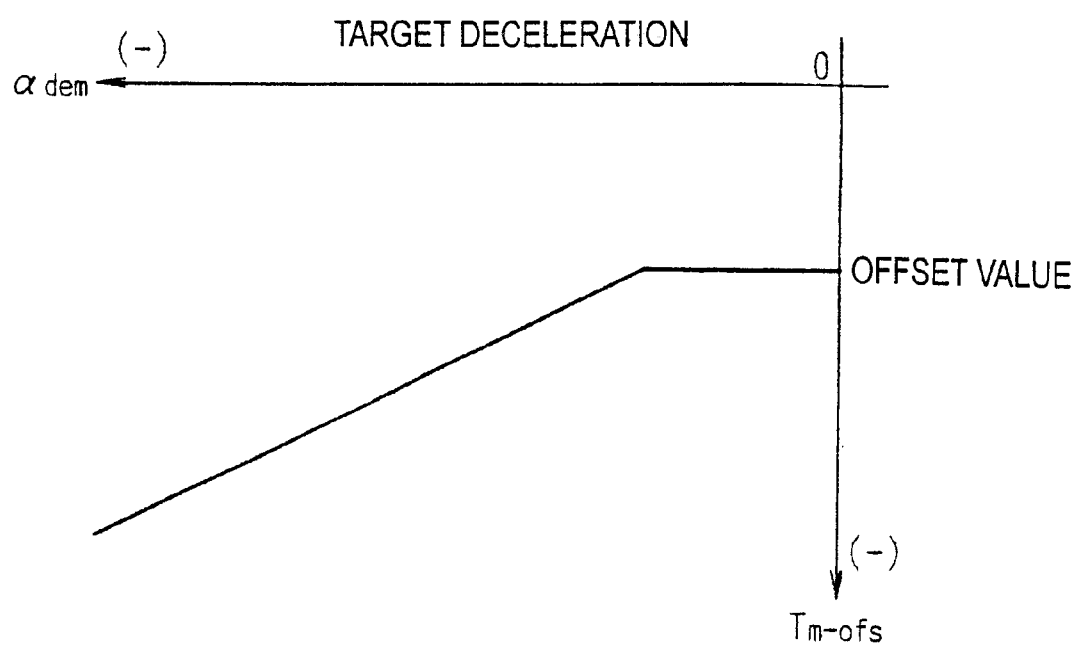
FIG. 7 shows a control map used during the processing shown in FIG. 6.

In step S132, the regenerative cooperative braking control unit 19 sets the regenerative braking torque offset value $T_{m\text{-}ofs}$ in accordance with the target deceleration $\alpha_{dem}$ using the control map shown in FIG. 7 and proceeds to step S134. With this control map, the smaller the target deceleration is (the larger the magnitude of the deceleration is) the smaller the negative regenerative braking torque offset value $T_{m\text{-}ofs}$ is.

In step S134, the regenerative cooperative braking control unit 19 determines if the phase compensated regenerative braking torque command value $T_{m\text{-}comP}$ obtained in step S12 of FIG. 3 is less than or equal to the sum (negative value) of the maximum regenerative torque $T_{mmax}$ (negative value) and the regenerative braking torque offset value $T_{m\text{-}ofs}$ (negative value) set in step S132. If the phase compensated regenerative braking torque command value $T_{m\text{-}comP}$ is less than or equal to the sum of the maximum regenerative torque $T_{mmax}$ and the regenerative braking torque offset value $T_{m\text{-}ofs}$, then the control unit 19 proceeds to step S135. If not, the control unit 19 proceeds to step S136.

In step S135, the regenerative cooperative braking control unit 19 sets the regenerative braking restriction flag FLG to "1" and proceeds to step S137.

Meanwhile, in step S133, the regenerative cooperative braking control unit 19 determines if the phase compensated regenerative braking torque command value $T_{m\text{-}com\_p}$ obtained in step S12 of FIG. 3 is greater than or equal to the maximum regenerative torque $T_{mmax}$ (negative value). If the phase compensated regenerative braking torque command value $T_{m\text{-}comP}$ is greater than or equal to the maximum regenerative torque $T_{mmax}$, then the control unit 19 proceeds to step S138. If not, the control unit 19 proceeds to step S137.

In step S138, the regenerative cooperative braking control unit 19 resets the regenerative braking restriction flag to "0" and proceeds to step S136.

In step S137, the regenerative cooperative braking control unit 19 sets the reapportioned regenerative braking torque command value $T_{m\text{-}comP\text{-}adj}$ to the value of the maximum regenerative torque $T_{mmax}$ and proceeds to step S139.

In step S139, the regenerative cooperative braking control unit 19 adds the phase compensated front wheel hydraulic braking torque command value $T_{b\text{-}com\text{-}FP}$ obtained in step S12 to the value obtained by subtracting the maximum regenerative torque $T_{mmax}$ from the regenerative braking torque command value $T_{m\text{-}comP}$. The control unit 19 then sets the reapportioned front wheel hydraulic braking torque command value $T_{b\text{-}com\text{-}FP\text{-}adj}$ to the value of the resulting sum and proceeds to step S14 of FIG. 3.

On the other hand, in step 136, the value of the phase compensated regenerative braking torque command value $T_{m\text{-}comP}$ is assigned without modification as the reapportioned regenerative braking torque command value $T_{m\text{-}comP\text{-}adj}$ and control proceeds to step S140.

In step S140, the phase compensated front wheel hydraulic braking torque command value $T_{b\text{-}com\text{-}FP}$ is assigned without modification as the reapportioned front wheel hydraulic braking torque command value $T_{b\text{-}com\text{-}FP\text{-}adj}$ and control proceeds to step S14 of FIG. 3.

With the processing just described, when the brake pedal 1 is depressed, the value of the vehicle deceleration $\alpha_V$ or the engine braking deceleration estimated value $\alpha_{eng}$ at that time is saved as the pre-brake operation deceleration $\alpha_0$, while the engine braking deceleration estimated value $\alpha_{eng}$ at that time is saved as the engine braking deceleration base value $\alpha_{eng0}$. The base deceleration $\alpha_B$ corresponding to the engine braking deceleration estimated value $\alpha_{eng}$ at that time is calculated using the resulting pre-brake operation deceleration $\alpha_0$ and engine braking deceleration base value $\alpha_{eng0}$, and the braking torque command value feedback component $T_{d\text{-}FB}$ is calculated based on the base deceleration $\alpha_B$, the actual vehicle deceleration $\alpha_V$, and the reference deceleration $\alpha_{ref}$. The braking torque command value $T_{d\text{-}com}$ is the sum of the braking torque command value feedback component $T_{d\text{-}FB}$ and the braking torque command value feed forward component $T_{d\text{-}FF}$. If the time $T_j$ from accelerator OFF to brake ON was greater than or equal to prescribed time $T_{j0}$, which corresponds to the time required for the engine braking force to converge, then the vehicle deceleration $\alpha_V$ at that time has been assigned as the value of the pre-brake operation deceleration $\alpha_0$. Consequently, if an engine braking force, deceleration resulting from an upward slope, or acceleration resulting from a downward slope is acting on the vehicle at the time of brake operation, then those influences are expressed in the vehicle deceleration $\alpha_V$ and reflected in the pre-brake operation deceleration $\alpha_0$. Therefore, the base deceleration $\alpha_B$ calculated later is a value that reflects these acceleration/deceleration influences and the braking torque command value feedback component $T_{d\text{-}FB}$ corresponding to the difference between this base deceleration $\alpha_B$ and the vehicle deceleration $\alpha_V$ is a value that reflects only fluctuations in the engine braking force. Thus, so long as the brake pedal operation amount is fixed and the braking torque command value feed forward component $T_{d\text{-}FF}$ is equal or almost equal, the deceleration intended by the driver can be achieved.

Also, even when downshifting or the like causes the engine braking force to change during braking, the difference between the engine braking deceleration estimated value $\alpha_{eng}$ at that time and the engine braking deceleration base value $\alpha_{eng0}$ can be reflected in the base deceleration $\alpha_B$. Consequently, even after such a change occurs, the deceleration intended by the driver can continue to be achieved based on the braking torque command value feedback component $T_{d\text{-}FB}$, which corresponds to the difference between the base deceleration $\alpha_B$ and the vehicle deceleration $\alpha_V$.

If the time $T_j$ from accelerator OFF until brake ON is less than prescribed time $T_{j0}$, which is equivalent to the time required for the engine braking force to converge, then the pre-brake operation deceleration $\alpha_0$ is set to the engine braking deceleration estimated value $\alpha_{eng}$. Consequently, the deceleration intended by the driver can be achieved after the engine braking force converges.

Figure 8:
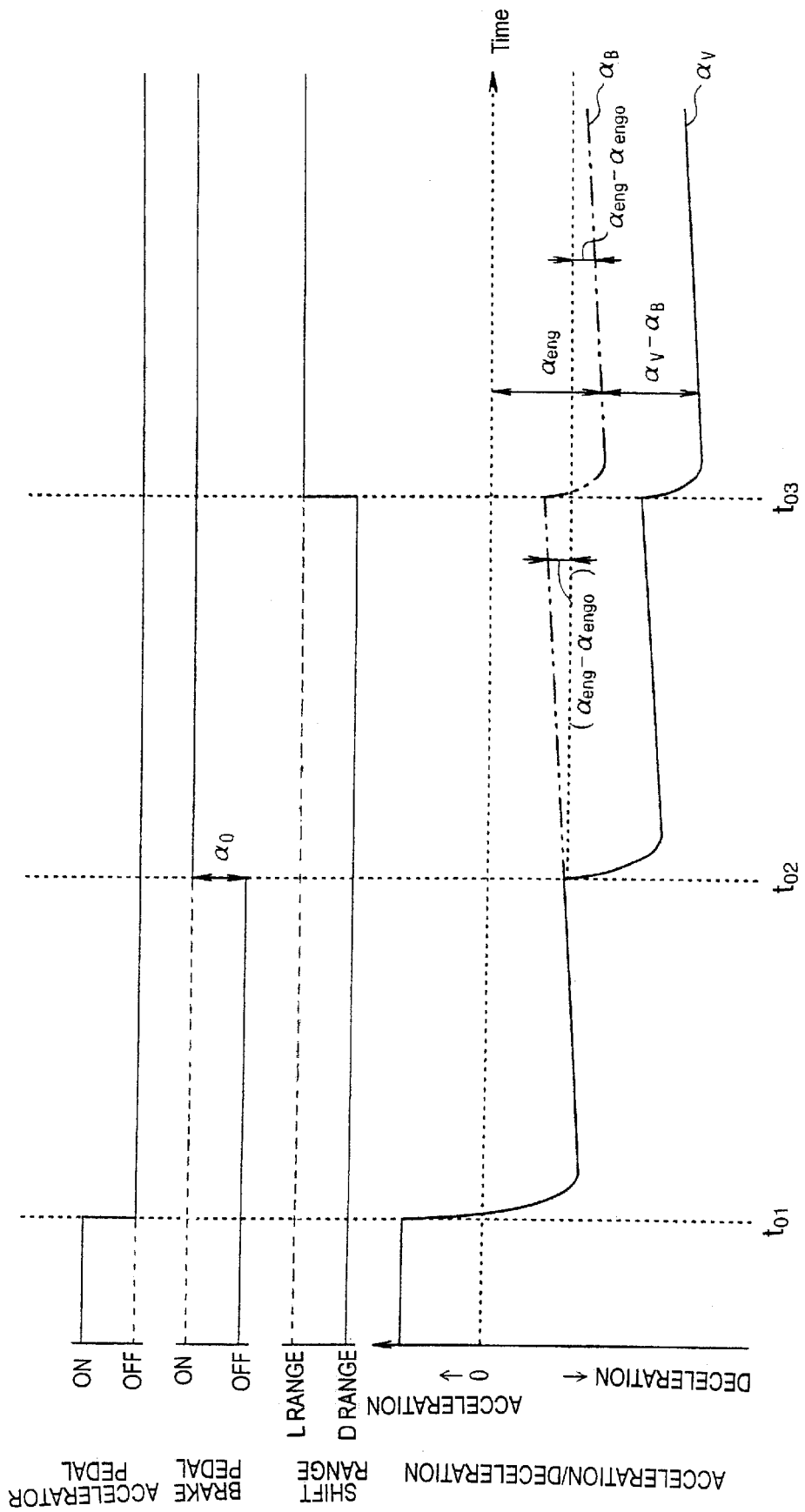
FIG. 8 is a time chart showing the change in vehicle deceleration resulting from the processing shown in FIG. 3.

Referring now to FIG. 8, the time chart shows the change in the vehicle acceleration/deceleration over time achieved with the processing shown in FIG. 3. In this time chart, while the vehicle is traveling on a level road, accelerator OFF occurs at time $t_{01}$, brake ON occurs at time $t_{02}$, and downshifting occurs at time $t_{03}$. Also, the amount by which the brake pedal 1 is depressed, i.e., the master cylinder pressure $P_{mc}$, remains constant after brake ON. When accelerator OFF occurs at time $t_{01}$, deceleration of the vehicle occurs due to engine braking but the value of that deceleration gradually increases (decreases in terms of the magnitude of deceleration) as the traveling speed of the vehicle decreases.

When brake ON occurs at time $t_{02}$, the vehicle deceleration $\alpha_V$ at that time is assigned as the pre-brake operation deceleration $\alpha_0$ and the engine braking deceleration estimated value $\alpha_{eng}$ at that time is assigned as the engine braking deceleration base value $\alpha_{eng0}$. Thus, after time $t_{02}$, the deceleration ($\alpha_V$-$\alpha_B$) corresponding to the brake pedal depression amount is added to that the deceleration $\alpha_B$ (=$\alpha_0$) that existed up until that time. Thereafter, as the vehicle traveling speed decreases and the engine braking deceleration estimated value $\alpha_{eng}$ increases (decreases in terms of the magnitude of deceleration), the deceleration base value $\alpha_B$ increases by the difference between the engine braking deceleration estimated value $\alpha_{eng}$ and the engine braking deceleration base value $\alpha_{eng0}$. As a result, the value of the vehicle deceleration $\alpha_V$ produced by the brake fluid pressure control and the regenerative brake control increases (decreases in terms of the magnitude of deceleration) by the amount of the increase in engine braking force.

When downshifting occurs at time $t_{03}$, the engine braking deceleration estimated value $\alpha_{eng}$ decreases (increases in terms of the magnitude of deceleration) accordingly and the deceleration base value $\alpha_B$ decreases (increases in terms of the magnitude of deceleration) by the difference between this engine braking deceleration estimated value $\alpha_{eng}$ and the engine braking deceleration base value $\alpha_{eng0}$. As a result, the value of the vehicle deceleration $\alpha_V$ produced by the brake fluid pressure control and the regenerative brake control decreases (increases in terms of the magnitude of deceleration) by the amount of the decrease in engine braking force. Afterwards, however, the engine braking force will increase as the vehicle speed decreases and the value of the vehicle deceleration $\alpha_V$ will gradually increase (decrease in terms of the magnitude of deceleration).

Figure 9:
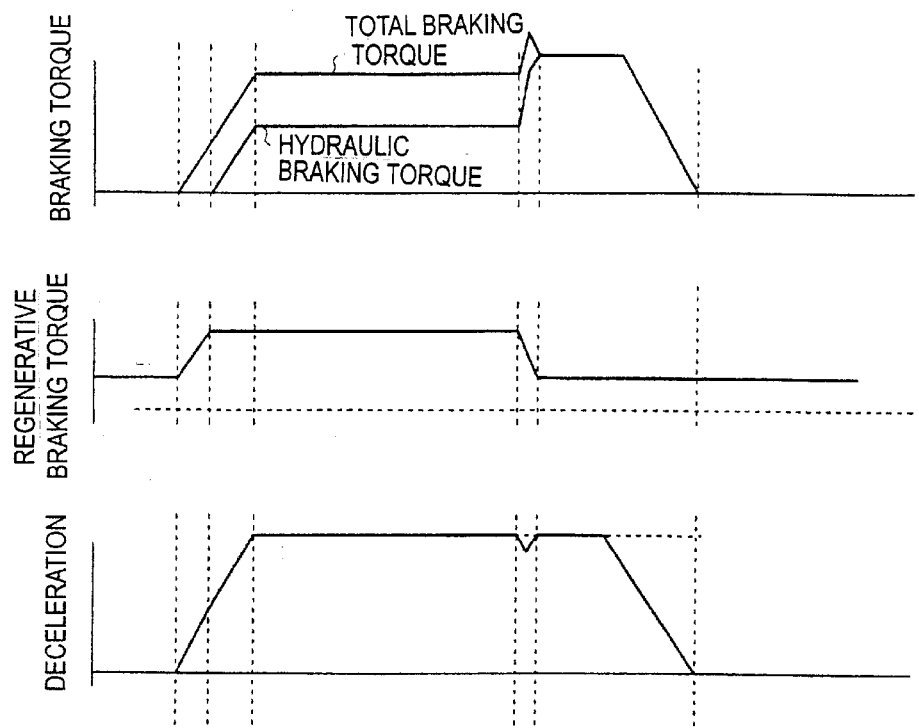
FIG. 9 shows three time charts that illustrate the change in braking torque and vehicle deceleration resulting from the processing shown in FIG. 3.

FIG. 9 shows a simulation of how the deceleration of the vehicle changes in a situation where the regenerative braking torque decreases suddenly during execution of the braking torque control processing described in FIG. 3. Although, as explained previously, the target deceleration $\alpha_{dem}$ is a negative value and thus the various braking torques are expressed as negative values, here all decelerations and torques are expressed as absolute values, i.e., magnitudes only. In this embodiment, the regenerative braking torque and hydraulic braking torque are controlled while feeding back the deceleration $\alpha_V$ of the vehicle. Therefore, if, for example, the regenerative braking torque decreases suddenly and the vehicle deceleration $\alpha_V$ is about to decrease, the decrease in the vehicle deceleration $\alpha_V$ is suppressed or prevented by quickly increasing the hydraulic braking torque. Neither the deceleration during the transient period while the regenerative braking torque is decreasing rapidly, nor the steady deceleration that occurs thereafter changes very much in comparison to the value preceding the sudden change in regenerative braking torque. Thus, even in this kind of situation, the deceleration intended by the driver can continue to be achieved.

Figure 10:
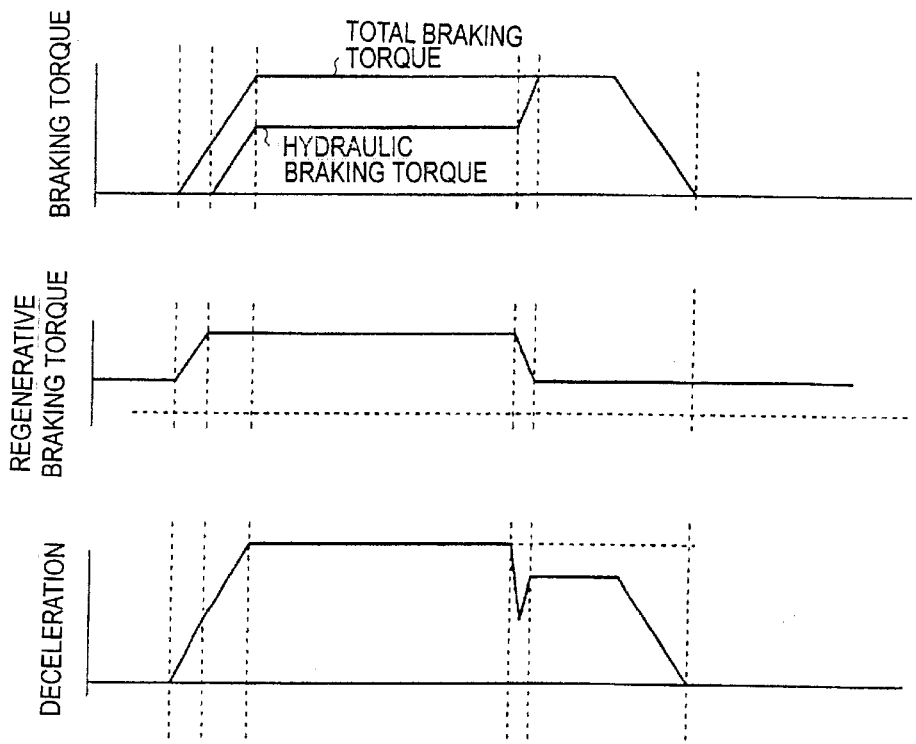
FIG. 10 shows three time charts that illustrate the change in vehicle deceleration resulting from conventional braking force control.

Conversely, FIG. 10 (numeric values are shown as absolute values) shows a case where the target deceleration is simply set based on the brake pedal depression amount and the hydraulic braking torque is controlled so as to make the deceleration of the vehicle match the target deceleration. In this case, only after the actual vehicle deceleration begins to decrease is the hydraulic braking torque increased uniformly. As a result, both the deceleration during the transient period while the regenerative braking torque is decreasing rapidly and the steady deceleration that occurs thereafter change greatly and it is difficult to continue achieving the deceleration intended by the driver.

With this embodiment, both the regenerative braking performed by the motor generator 15 and the hydraulic braking performed by the wheel cylinders 5 are phase compensated in step 12 of the processing described in FIG. 3. Thus, the response characteristics of both braking system are made to match the vehicle model response characteristic. Also, the time constant of the vehicle model response characteristic is set to a larger value than the time constant of the ideal reference model response characteristic such that the response characteristic of the vehicle model is more delayed than the response characteristic of the ideal reference model.

Figure 11:
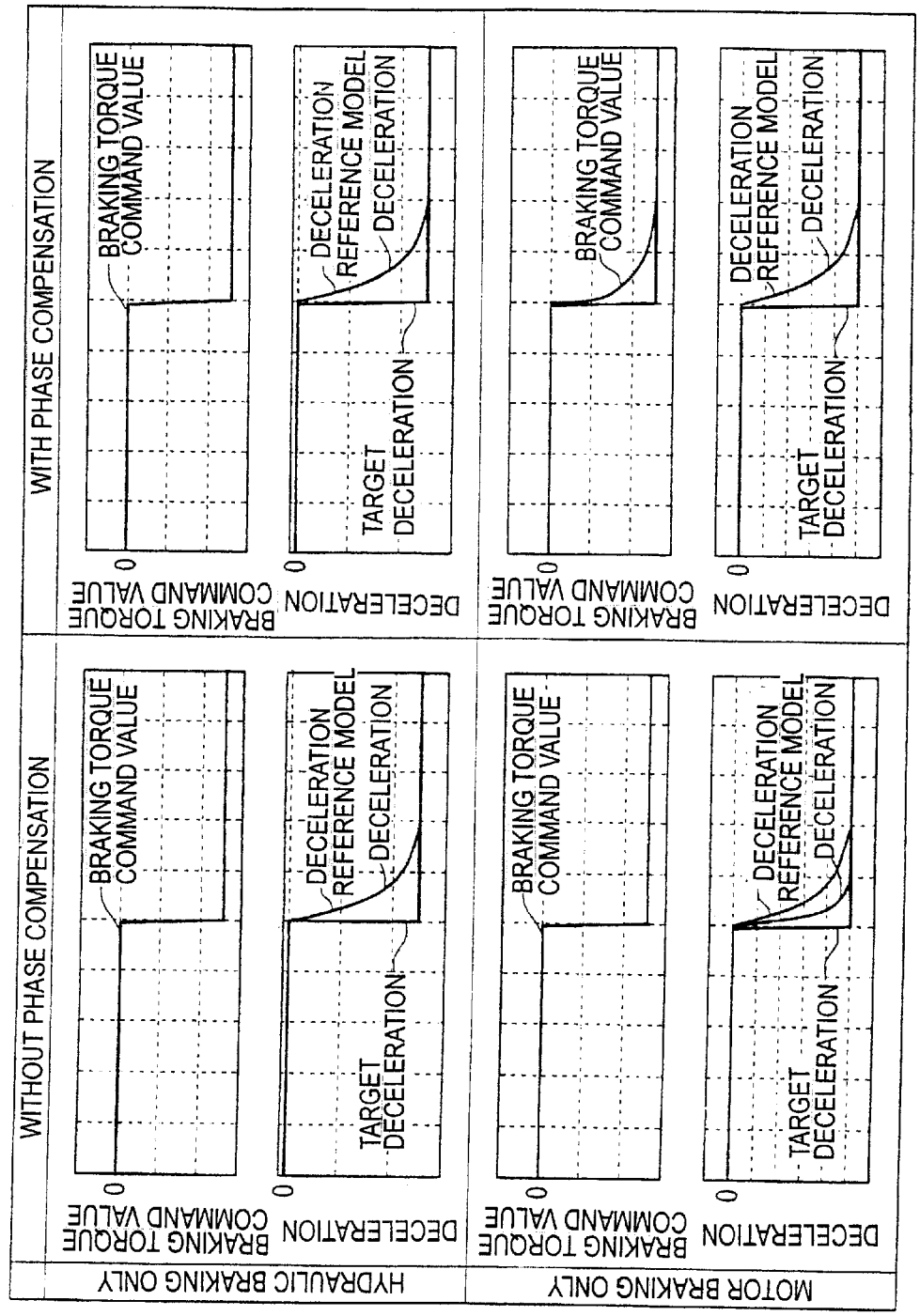
FIG. 11 shows several time charts that illustrate the change in the vehicle deceleration.

In a vehicle that, like this embodiment, has both a regenerative braking system and a hydraulic braking system and gives priority to use of the regenerative braking system, there are times when only hydraulic braking is performed and times when only regenerative braking is performed. FIG. 11 shows the deceleration state in each situation. In the case without phase compensation, which is equivalent to a conventional system, the regenerative braking system and the hydraulic braking system have different responses to the command value. For example, to the braking system that responds slowly, suppose the braking torque command value is computed so that the deceleration is realized in accordance with the ideal model. The problem in this case is that the actual deceleration will not match with the ideal model deceleration if the braking torque command value is appointed to the braking system that responds faster. Thus, the deceleration expected by the driver cannot be attained. Meanwhile, in the case of this embodiment, phase compensation is conducted so as to make the response characteristics of both the regenerative braking system and the hydraulic braking system match a vehicle model for which the time constant is larger than the time constant of the aforementioned ideal deceleration reference model. In particular, the deceleration produced by regenerative braking follows the reference model well.

Figure 12:
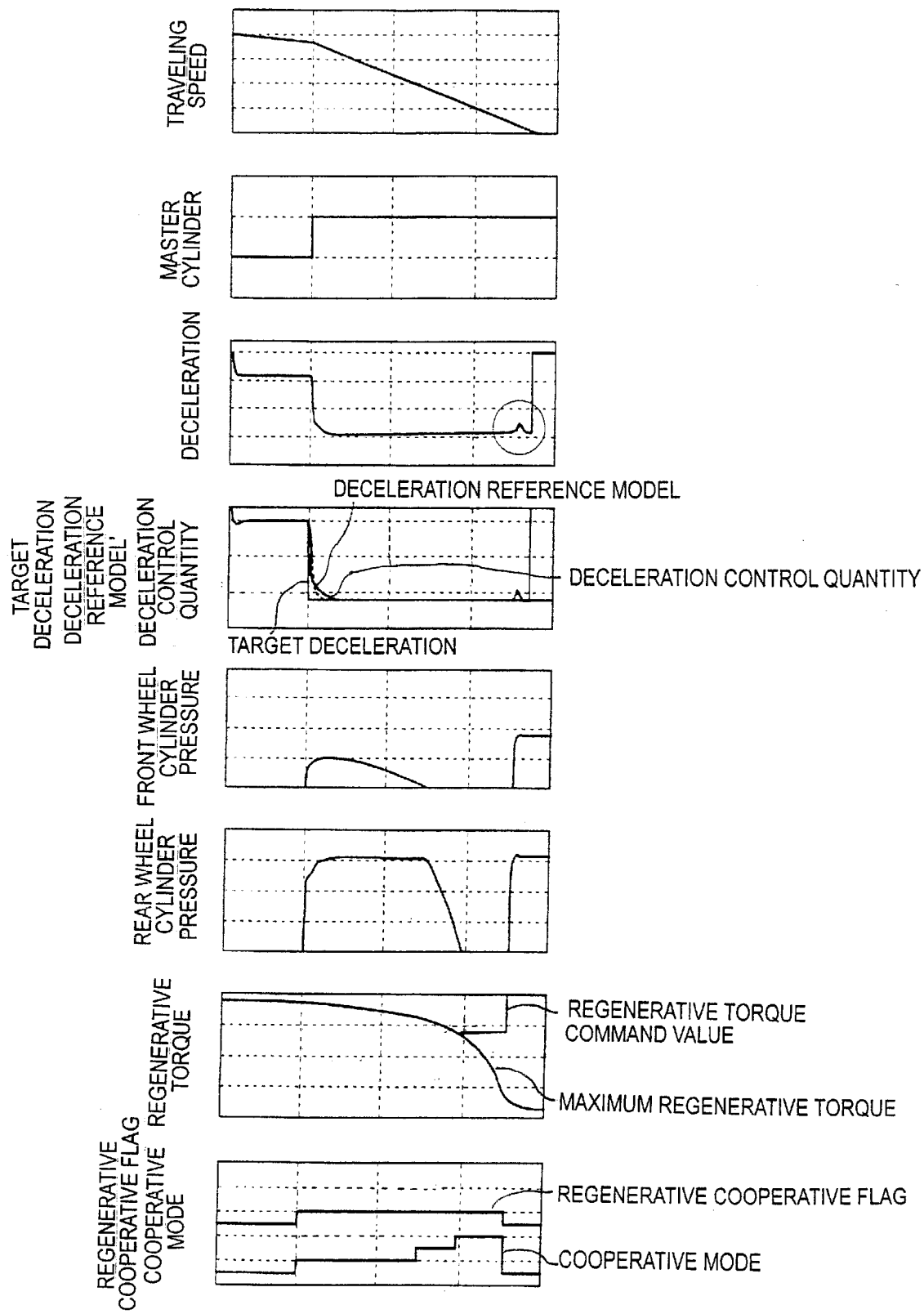
FIG. 12 shows several time charts that illustrate the change in the vehicle deceleration.
Figure 13:
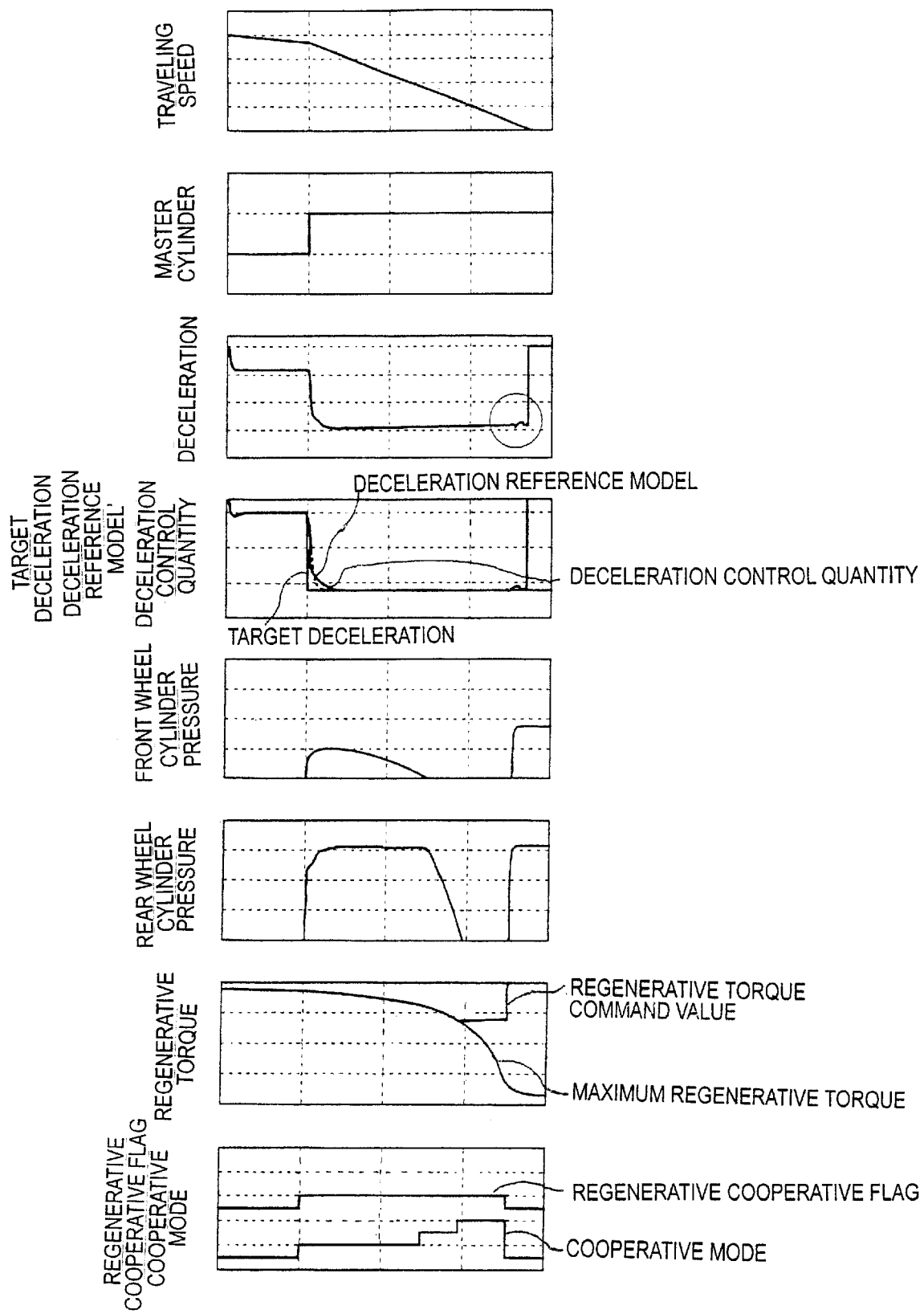
FIG. 13 shows several time charts that illustrate the change in the vehicle deceleration.

Even if the brake operation amount executed by the driver is constant, the apportionment to each braking system can vary greatly depending on the state of the vehicle. In particular, the braking torque distribution changes greatly when the vehicle switches from cooperative braking, in which both the regenerative braking system and the hydraulic braking system conduct braking simultaneously, to regenerative braking only or hydraulic braking only. FIG. 12 illustrates a conventional case in which phase compensation is not conducted. The encircled portion indicates the change in deceleration at the point in time when the vehicle switches from cooperative braking to hydraulic braking only. As is clear from FIG. 12, fluctuation of the deceleration is observed when the vehicle switches to a braking mode having a different response characteristic. Conversely, as shown in the encircled portion of FIG. 13, this embodiment suppresses fluctuation in the deceleration at the point in time when the vehicle switches from cooperative braking to hydraulic braking only.

Figure 14:
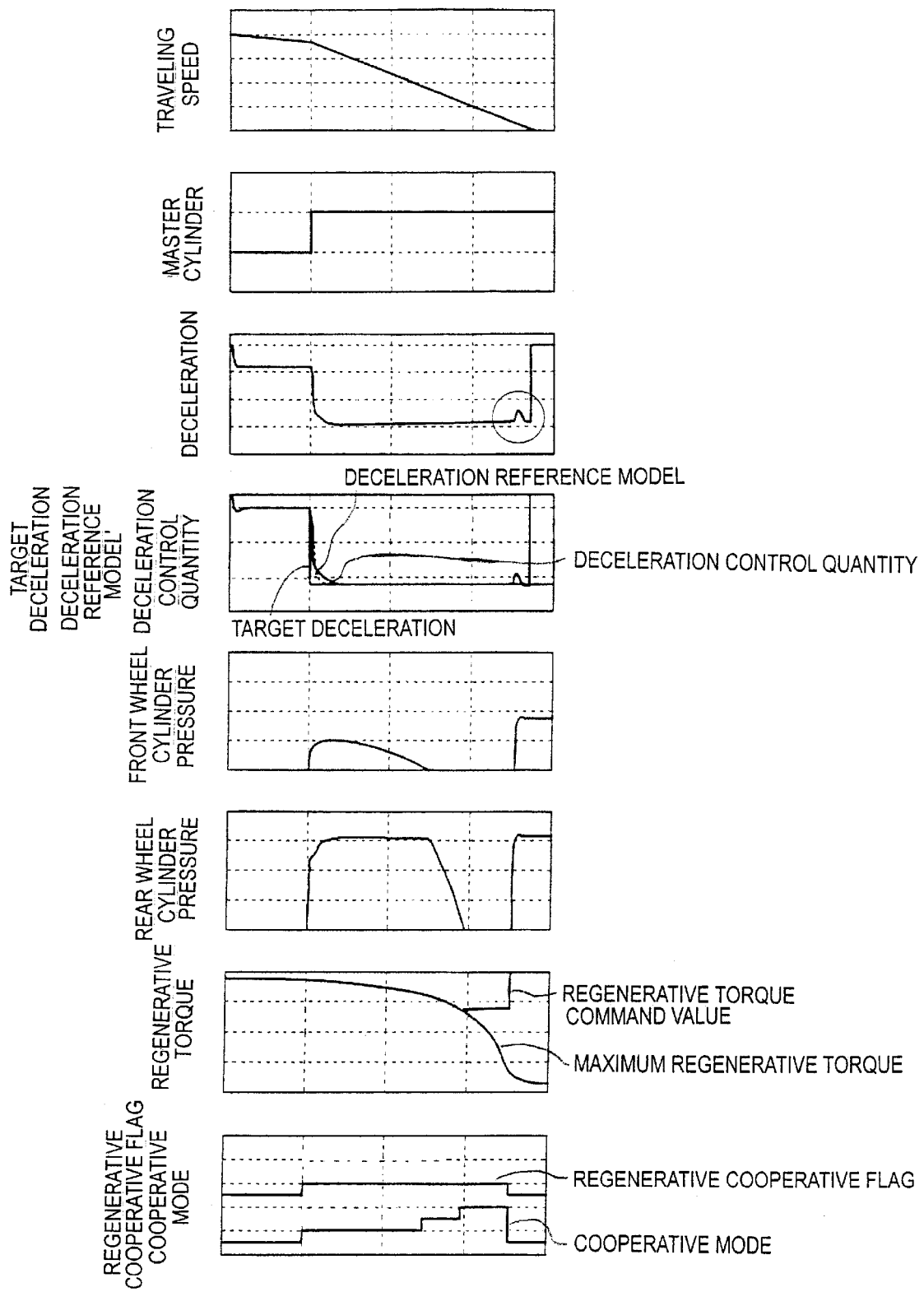
FIG. 14 shows several time charts that illustrate the change in the vehicle deceleration.
Figure 15:
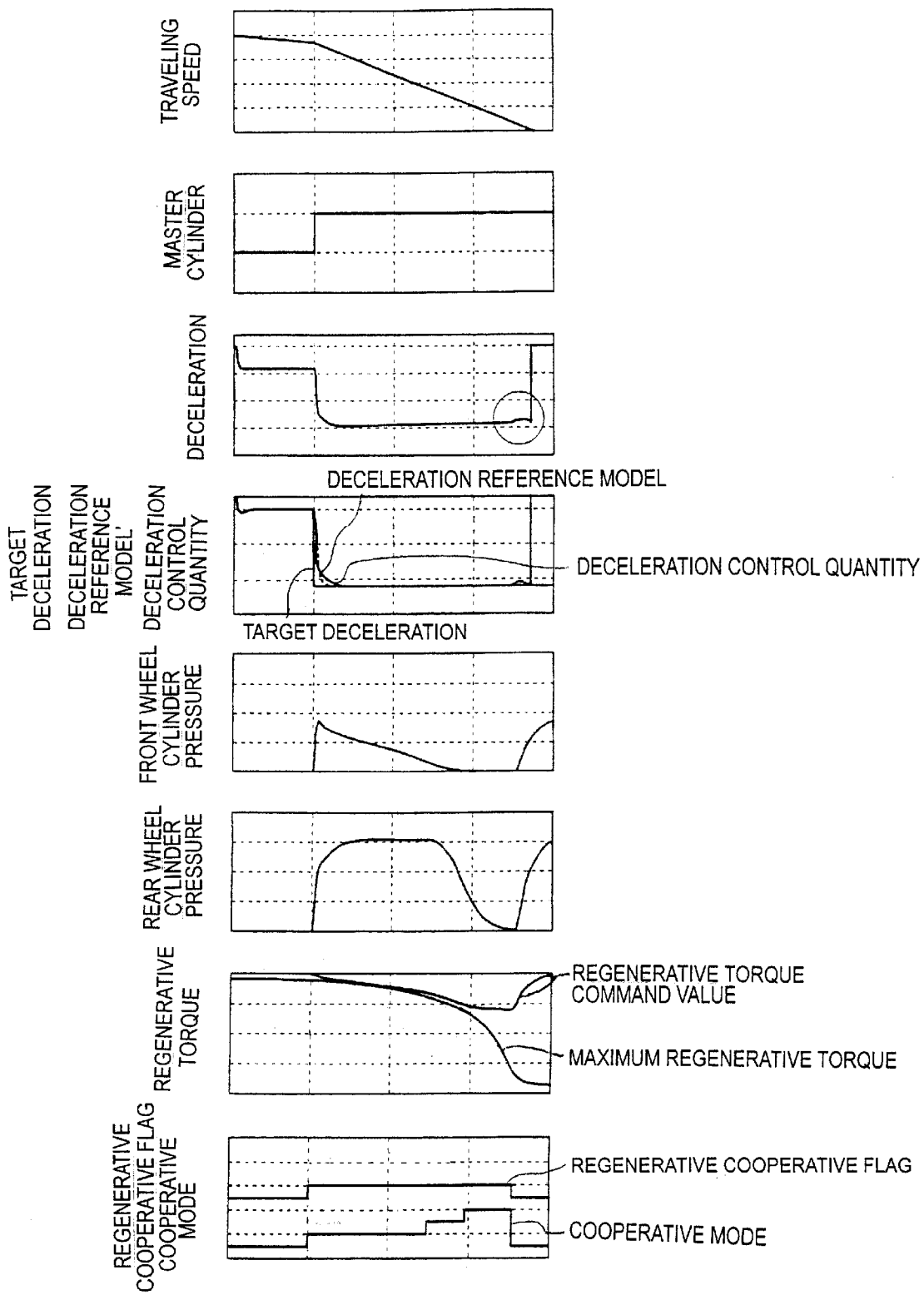
FIG. 15 shows several time charts that illustrate the change in the vehicle deceleration.

Depending the state of the vehicle, including such factors as brake variation and changes that occur over time, there are cases where the response characteristics the braking system differ from the respective rated characteristics of braking system. FIGS. 14 and 15 show the change in the deceleration that occurs when constant braking is performed after 50 milliseconds of excess time has been added to the rated brake characteristic of the hydraulic braking system. FIG. 14 shows a case in which the time constant of the aforementioned vehicle model response characteristic is set to a smaller value than the time constant of the ideal reference model response characteristic and the response characteristic of the vehicle model is faster than the response characteristic of the ideal reference model. At the point in time (indicated by the encircled portion) when the vehicle switches from cooperative braking to hydraulic braking only, the hydraulic braking system reacts in an oversensitive manner and the deceleration fluctuates. Conversely, as shown in FIG. 15, this embodiment is arranged such that the time constant of the aforementioned vehicle model response characteristic is set to a larger value than the time constant of the ideal reference model response characteristic and the response characteristic of the vehicle model is slower than the response characteristic of the ideal reference model. At the point in time (indicated by the encircled portion) when the vehicle switches from cooperative braking to hydraulic braking only, the reaction of the hydraulic braking system is restrained and fluctuation of the deceleration is restrained.

Figure 16:
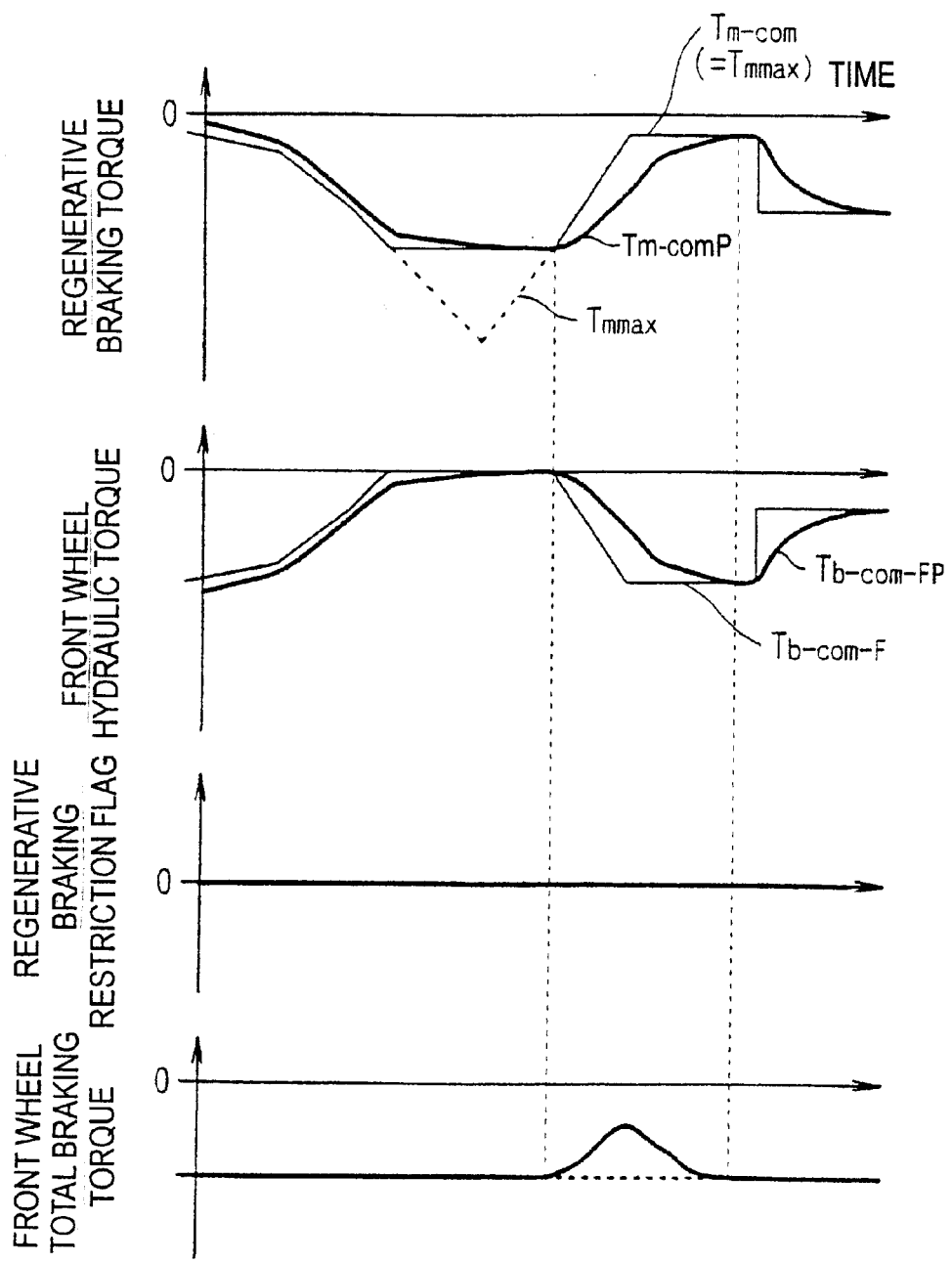
FIG. 16 shows several time charts that illustrate the change in the braking torque.

Furthermore, in this embodiment, phase compensated regenerative braking torque command value is compared to the maximum regenerative torque and if the phase compensated regenerative braking torque command value cannot be reached, the maximum regenerative torque is assigned as the reapportioned regenerative braking torque command value and the sum of the phase compensated front wheel hydraulic braking torque command value and the difference between the phase compensated regenerative braking torque command value and the maximum regenerative torque, i.e., the value obtained by subtracting the maximum regenerative torque from the phase compensated regenerative braking torque command value, is assigned as the reapportioned front wheel hydraulic braking torque command value. FIG. 16 shows how the front wheel total braking torque changes with time when this kind of comparison is not conducted and the phase compensated regenerative braking torque command value $T_{m\text{-}comP}$ is not adjusted before being outputted as the command value. This simulation illustrates a case in which the braking torque required for the front wheels, i.e., the target deceleration $\alpha_{dem}$, is constant and the maximum regenerative torque $T_{mmax}$ has suddenly increased (decreased in terms of the magnitude of deceleration) due to, for example, the charged state of the battery. Before the aforementioned phase compensation is performed, the regenerative braking torque command value $T_{m\text{-}com}$ is restricted by the maximum regenerative torque $T_{mmax}$. Conversely, depending on the situation, the phase compensated regenerative braking torque command value $T_{m\text{-}comP}$ may be smaller (larger in terms of magnitude of deceleration) than the maximum regenerative torque $T_{mmax}$, thus making the required deceleration substantially unattainable. Thus, if the phase compensated regenerative braking torque command value $T_{m\text{-}comP}$ is numerically smaller than the maximum regenerative torque $T_{mmax}$, i.e., if the magnitude of the deceleration demanded by the command value is larger than the magnitude of the deceleration corresponding to the maximum regenerative torque, the front wheel total braking torque will be insufficient.

Figure 17:
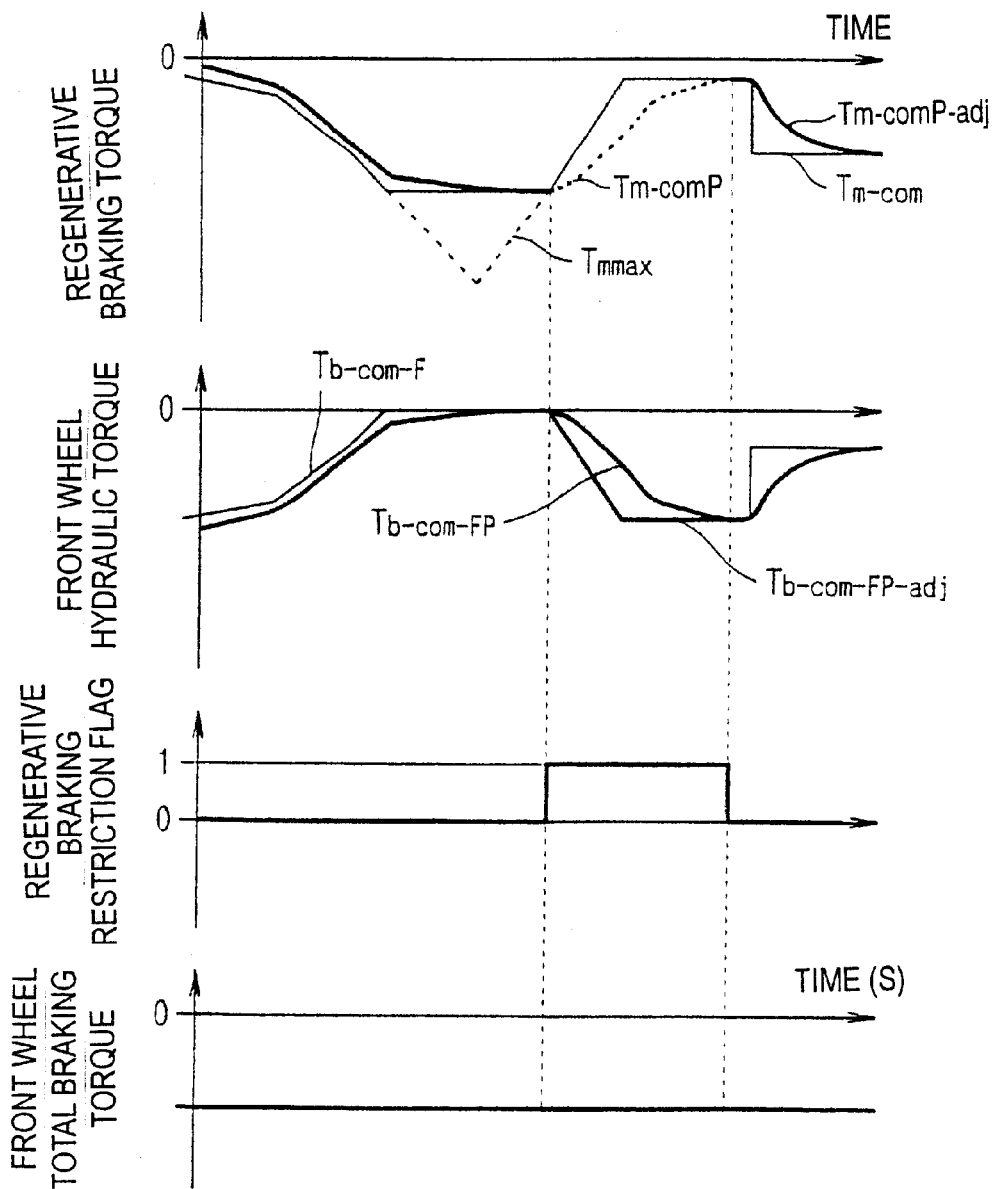
FIG. 17 shows several time charts that illustrate the change in the braking torque.

Meanwhile, as shown in FIG. 17, this embodiment compares the phase compensated regenerative braking torque command value $T_{m\text{-}comP}$ to the maximum regenerative torque $T_{mmax}$. If the phase compensated regenerative braking torque command value $T_{m\text{-}comP}$ cannot be reached, i.e., if the phase compensated regenerative braking torque command value $T_{m\text{-}comP}$ is smaller (larger in terms of the magnitude of deceleration) than the maximum regenerative torque $T_{mmax}$, then the maximum regenerative torque $T_{mmax}$ is assigned as the reapportioned regenerative braking torque command value $T_{m\text{-}comP\text{-}adj}$ and the reapportioned regenerative braking torque command value is sent. Additionally, the amount by which the reapportioned regenerative braking torque command value $T_{m\text{-}comP\text{-}adj}$ increased (decreased in terms of the magnitude of deceleration), i.e., the value obtained by subtracting the maximum regenerative torque $T_{mmax}$ from the phase compensated regenerative braking torque command value $T_{m\text{-}comP}$, is added to the phase compensated front wheel hydraulic braking torque command value $T_{b\text{-}com\text{-}FP}$ to calculate the reapportioned front wheel hydraulic braking torque command value $T_{b\text{-}com\text{-}FP\text{-}adj}$ and the reapportioned front wheel hydraulic braking torque command value is sent. Therefore, the amount by which the magnitude of the deceleration produced by regenerative braking torque decreases is compensated by the hydraulic braking torque and the same front wheel total braking torque as before is obtained after the phase compensated regenerative braking torque command value $T_{m\text{-}comP}$ has become smaller (larger in terms of magnitude of deceleration) than the maximum regeneration torque $T_{mmax}$.

Figure 18:
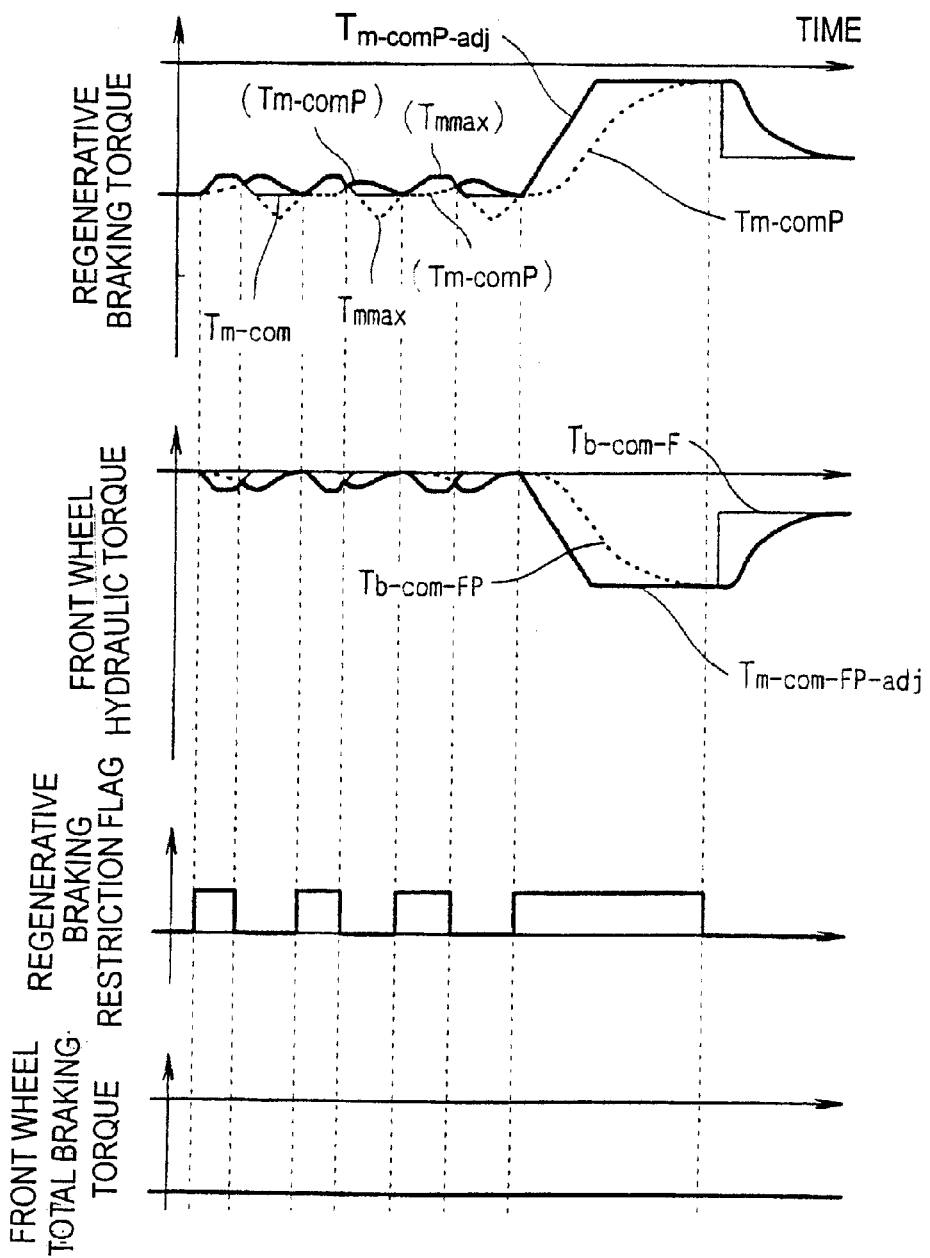
FIG. 18 shows several time charts that illustrate the change in the braking torque.

Furthermore, this embodiment arranged such that the phase compensated regenerative braking torque command value is compared to the value obtained by adding a regenerative braking torque offset value to the maximum regenerative torque when the previously described reapportionment of the braking torque command value is to be started and the phase compensated regenerative braking torque command value is compared to the maximum regenerative torque when the reapportionment of the braking torque command value is to be ended. In short, hysteresis is provided in the start threshold value and the end threshold value of the control processing. FIG. 18 shows how the front wheel total braking torque changes over time when reapportionment of the braking torque command value is started and ended without providing this kind of hysteresis. This simulation illustrates a case in which the braking torque required at the front wheels, i.e., the target deceleration $\alpha_{dem}$, is constant and the maximum regenerative torque $T_{mmax}$ has fluctuated in small increments due to, for example, the charged state of the battery. Similarly to the previously discussed case, the front wheel total braking torque is stable because these fluctuations in the maximum regenerative torque $T_{mmax}$ are compensated for by the reapportioned regenerative braking torque command value $T_{m\text{-}comP\text{-}adj}$ and the reapportioned front wheel hydraulic braking torque command value $T_{b\text{-}com\text{-}FP\text{-}adj}$. However, the reapportioned regenerative braking torque command value $T_{m\text{-}comP\text{-}adj}$ and the reapportioned front wheel hydraulic braking torque command value $T_{b\text{-}com\text{-}FP\text{-}adj}$ fluctuate frequently because the braking torque command value undergoes reapportionment control every time the phase compensated regenerative braking torque command value $T_{m\text{-}comP}$ becomes smaller (larger in terms of the magnitude of deceleration) than the maximum regenerative torque $T_{mmax}$.

Figure 19:
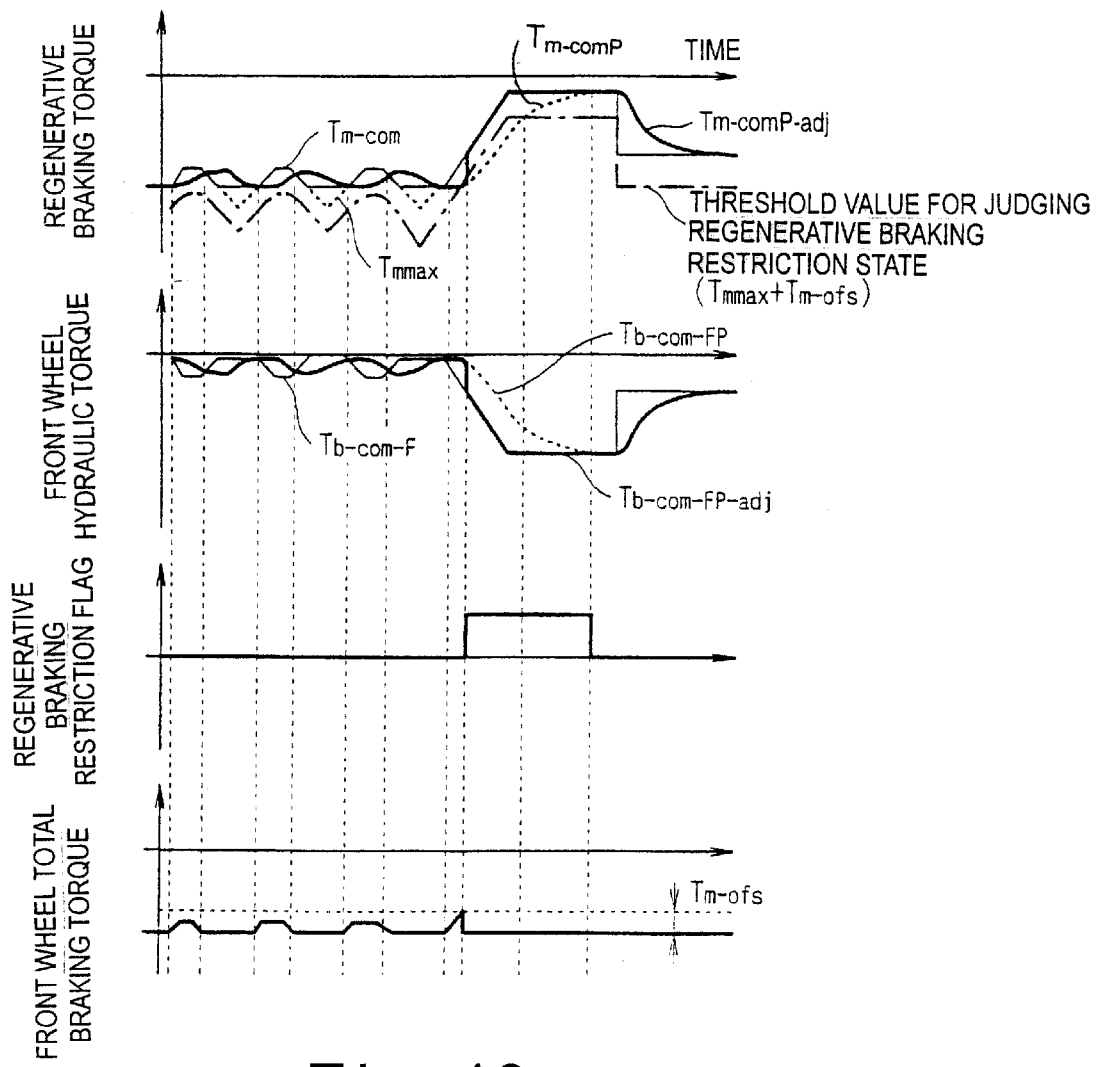
FIG. 19 shows several time charts that illustrate the change in the braking torque.

Conversely, FIG. 19 shows a case in which hysteresis is provided with respect to starting and ending the reapportionment control of the braking torque command value using the regenerative braking torque offset value $T_{m\text{-}ofs}$ as previously described and the fluctuations of the reapportioned regenerative braking torque command value $T_{m\text{-}comP\text{-}adj}$ and the reapportioned front wheel hydraulic braking torque command value $T_{b\text{-}com\text{-}FP\text{-}adj}$ can be suppressed. However, the front wheel total braking torque does fluctuate. Even at its largest, the amplitude of these fluctuations in the front wheel total braking torque is no larger than the absolute value of the regenerative braking torque offset value $T_{m\text{-}ofs}$ (the fluctuation amplitude is less than or equal to the magnitude of the hysteresis). Therefore, the front wheel braking torque fluctuations will not be felt by the driver if the regenerative braking torque offset value $T_{m\text{-}ofs}$ is set based on the minimum amplitude of deceleration variation that can be felt by the driver. Also, this embodiment is constituted such that the larger the absolute value of the target deceleration $\alpha_{dem}$ (which corresponds to the brake operation amount performed by the driver, i.e., the deceleration requested by the driver) is, the larger the absolute value of the regenerative braking torque offset value $T_{m\text{-}ofs}$ (i.e., the fluctuation amplitude of the front wheel total torque) set by the control unit is. Generally speaking, assuming equal deceleration fluctuations, the deceleration fluctuations will be more difficult to feel when the deceleration requested by the driver is large (i.e., the numeric value of the target deceleration $\alpha_{dem}$ is small). Therefore, when decelerations of larger magnitudes are requested, the deceleration fluctuations are not felt by the driver and fluctuations of the reapportioned regenerative braking torque command value $T_{m\text{-}comP\text{-}adj}$ and the reapportioned front wheel hydraulic braking torque command value $T_{b\text{-}com\text{-}FP\text{-}adj}$ can be suppressed.

In this embodiment, the wheel cylinders 5, the pump 21, the pressure increasing valve 8, and the pressure reducing value 9 constitute a hydraulic braking device of the present invention and the motor generator 15 constitutes a regenerative braking device. Steps S1 and S4 of the processing described in FIG. 3 constitute a target deceleration setting section or device. Step S2 of the processing described in FIG. 3 constitutes a deceleration detecting section or device. Steps S5 to S10 of the processing described in FIG. 3 constitute a braking torque command value calculating section or device. Step S11 of the processing described in FIG. 3 constitutes a braking force apportioning section or device. Step S12 of the processing described in FIG. 3 constitutes a phase compensating section or device. Steps S14 and S15 of the processing described in FIG. 3 and the brake fluid pressure control unit 13 constitute a hydraulic brake control section or device. Step S15 of the processing described in FIG. 3 and the motor control unit constitute a regenerative brake control section or device. Step S13 of the processing described in FIG. 3 constitutes a braking force reapportioning section or device.

The term "configured" as used herein to describe a component, section or part of a device includes hardware and/or software that is constructed and/or programmed to carry out the desired function.

Moreover, terms that are expressed as "means-plus-function" in the claims should include any structure that can be utilized to carry out the function of that part of the present invention.

The terms of degree such as "substantially", "about" and "approximately" as used herein mean a reasonable amount of deviation of the modified term such that the end result is not significantly changed.

This application claims priority to Japanese Patent Application No. 2002-212899 and Japanese Patent Application No. 2002-037591. The entire disclosures of Japanese Patent Application No. 2002-212899 and Japanese Patent Application No. 2002-037591 are hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A brake control apparatus comprising:

a hydraulic braking system configured to impart a hydraulic braking force to a wheel using brake fluid pressure with a hydraulic braking response characteristic;

a regenerative braking system configured to impart a regenerative braking force to the wheel using regenerative braking with a regenerative braking response characteristic;

a target deceleration setting device configured to set a target deceleration based on a signal indicative of a braking operation amount;

a deceleration detecting device configured to detect a deceleration experienced by the wheel;

a braking force command value calculating device configured to calculate a braking force command value that is needed to cause the deceleration detected by the deceleration detecting device to substantially match the target deceleration set by the target deceleration setting device based on an ideal reference model response characteristic;

a braking force apportioning device configured to apportion the braking force command value calculated by the braking force command value calculating device into a hydraulic braking force command value to be applied by the hydraulic braking system and a regenerative braking force command value to be applied by the regenerative braking system;

a phase compensating device configured to apply a phase compensation to at least one of the hydraulic braking force command value and the regenerative braking force command value obtained by the braking force apportioning device such that the hydraulic braking response characteristic of the hydraulic braking force command value and the regenerative braking response characteristic of the regenerative braking force command value substantially match a vehicle model response characteristic;

a hydraulic braking control device configured to control the hydraulic braking force applied to the wheel by the hydraulic braking system based on the hydraulic braking force command value that has been phase compensated by the phase compensating device; and a regenerative braking control device configured to control the regenerative braking force applied to the wheel by the regenerative braking system based on a regenerative braking force command value that has been phase compensated by the phase compensating device.

2. The brake control apparatus as recited in claim 1, wherein the phase compensating device applies the phase compensation to the regenerative braking force command value obtained by the braking force apportioning device.

3. The brake control apparatus as recited in claim 1, wherein the phase compensating device applies the phase compensation to both the hydraulic braking force command value and the regenerative braking force command value obtained by the braking force apportioning device.

4. The brake force control apparatus as recited in claim 1, wherein the target deceleration is feed forward compensated by a feed forward compensator based on the ideal reference model response characteristic and the vehicle model response characteristic so that the deceleration detected by the deceleration detecting device substantially matches with the ideal reference model response characteristic.

5. The brake control apparatus as recited in claim 3, wherein the vehicle model response characteristic of the phase compensating device is configured to set to be slower than the ideal reference model response characteristic of the braking force command value calculating device.

6. The brake control apparatus as recited in claim 1, further comprising a maximum regenerative braking force detecting device configured to detect a maximum available regenerative braking force of the regenerative braking system; and a braking force reapportioning device configured to reset the hydraulic braking force command value by reapportioning the difference between the regenerative braking force command value that has been phase compensated by the phase compensating device and the maximum regenerative braking force to the hydraulic braking force command value that has been phase compensated by the phase compensating device and set the regenerative braking force command value to the value of the maximum regenerative braking force, when the regenerative braking force command value that has been phase compensated by the phase compensating device cannot be reached based on the maximum available regenerative braking force detected by the maximum regenerative braking force detecting device;

the hydraulic braking control device being configured to control the hydraulic braking force applied to the wheel by the hydraulic braking system based on the hydraulic braking force command value set by the braking force reapportioning device; and the regenerative braking control device being configured to control the regenerative braking force applied to the wheel by the regenerative braking system based on the regenerative braking force command value set by the braking force reapportioning device.

7. The brake control apparatus as recited in claim 6, wherein the braking force reapportioning device is further configured to commence resetting of the hydraulic braking force command value and the regenerative braking force command value upon determination that the regenerative braking force command value that has been phase compensated by the phase compensating device cannot be reached based on the sum of the maximum available regenerative braking force detected by the maximum regenerative braking force detecting device and a prescribed offset value, and the braking force reapportioning device is configured to end setting of the hydraulic braking force command value and the regenerative braking force command value upon determination that the regenerative braking force command value that has been phase compensated by the phase compensating device can be reached based on the maximum available regenerative braking force alone.

8. The brake control apparatus as recited in claim 7, wherein the braking force reapportioning device is configured to set the prescribed offset value in accordance with the target deceleration set by the target deceleration setting device.

9. The brake force control apparatus as recited in claim 6, wherein the target deceleration is feed forward compensated by a feed forward compensator based on the ideal reference model response characteristic and the vehicle model response characteristic so that the deceleration detected by the deceleration detecting device substantially matches with the ideal reference model response characteristic.

10. The brake control apparatus as recited in claim 4, further comprising a maximum regenerative braking force detecting device configured to detect a maximum available regenerative braking force of the regenerative braking system; and a braking force reapportioning device configured to reset the hydraulic braking force command value by reapportioning the difference between the regenerative braking force command value that has been phase compensated by the phase compensating device and the maximum regenerative braking force to the hydraulic braking force command value that has been phase compensated by the phase compensating device and set the regenerative braking force command value to the value of the maximum regenerative braking force, when the regenerative braking force command value that has been phase compensated by the phase compensating device cannot be reached based on the maximum available regenerative braking force detected by the maximum regenerative braking force detecting device;

the hydraulic braking control device being configured to control the hydraulic braking force applied to the wheel by the hydraulic braking system based on the hydraulic braking force command value set by the braking force reapportioning device; and the regenerative braking control device being configured to control the regenerative braking force applied to the wheel by the regenerative braking system based on the regenerative braking force command value set by the braking force reapportioning device.

11. The brake control apparatus as recited in claim 10, wherein the braking force reapportioning device is further configured to commence resetting of the hydraulic braking force command value and the regenerative braking force command value upon determination that the regenerative braking force command value that has been phase compensated by the phase compensating device cannot be reached based on the sum of the maximum available regenerative braking force detected by the maximum regenerative braking force detecting device and a prescribed offset value, and the braking force reapportioning device is configured to end setting of the hydraulic braking force command value and the regenerative braking force command value upon determination that the regenerative braking force command value that has been phase compensated by the phase compensating device can be reached based on the maximum available regenerative braking force alone.

12. The brake control apparatus as recited in claim 11, wherein the braking force reapportioning device is configured to set the prescribed offset value in accordance with the target deceleration set by the target deceleration setting device.

13. A brake control apparatus comprising:

hydraulic braking means for imparting a hydraulic braking force to a wheel with a hydraulic braking response characteristic;

regenerative braking means for imparting a regenerative braking force to the wheel with a regenerative braking response characteristic;

target deceleration setting means for setting a target deceleration based on a signal indicative of a braking operation amount;

deceleration detecting means for detecting a deceleration experienced by the wheel;

braking force command value calculating means for calculating a braking force command value that is needed to cause the deceleration detected by the deceleration detecting means to substantially match the target deceleration set by the target deceleration setting means based on an ideal reference model response characteristic;

braking force apportioning means for apportioning the braking force command value calculated by the braking force command value calculating means into a hydraulic braking force command value to be applied by the hydraulic braking means and a regenerative braking force command value to be applied by the regenerative braking means;

phase compensating means for applying a phase compensation to at least one of the hydraulic braking force command value and the regenerative braking force command value obtained by the braking force apportioning means such that the hydraulic braking response characteristic of the hydraulic braking force command value and the regenerative braking response characteristic of the regenerative braking force command value substantially match a vehicle model response characteristic;

a hydraulic braking control means for controlling the hydraulic braking force applied to the wheel by the hydraulic braking means based on the hydraulic braking force command value that has been phase compensated by the phase compensating means; and a regenerative braking control means for controlling the regenerative braking force applied to the wheel by the regenerative braking means based on a regenerative braking force command value that has been phase compensated by the phase compensating means.

* * * * *